(12) United States Patent
Garthwaite et al.

(10) Patent No.: US 7,016,923 B2
(45) Date of Patent: Mar. 21, 2006

(54) MULTI-THREADED GARBAGE COLLECTOR EMPLOYING CASCADED MEMORY ARRAYS OF TASK IDENTIFIERS TO IMPLEMENT WORK STEALING QUEUES FOR TASK IDENTIFICATION AND PROCESSING

(75) Inventors: Alexander T. Garthwaite, Beverly, MA (US); Christine H. Flood, Westford, MA (US); David Dice, Foxborough, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 493 days.

(21) Appl. No.: 10/287,851

(22) Filed: Nov. 5, 2002

(65) Prior Publication Data

US 2004/0088702 A1 May 6, 2004

(51) Int. Cl.
*G06F 12/00* (2006.01)
(52) U.S. Cl. .................. 707/206; 707/205; 711/170; 711/154; 710/36; 718/100
(58) Field of Classification Search ............... 711/170, 711/154, 159; 710/36, 39, 52; 707/205, 707/206; 718/100, 107; 712/245, 200
See application file for complete search history.

(56) References Cited

U.S. PATENT DOCUMENTS

| | | | | |
|---|---|---|---|---|
| 4,907,151 | A * | 3/1990 | Bartlett ..................... | 711/166 |
| 5,321,841 | A * | 6/1994 | East et al. ................. | 718/107 |
| 6,438,573 | B1 * | 8/2002 | Nilsen ....................... | 718/100 |
| 6,526,422 | B1 * | 2/2003 | Flood et al. ............... | 707/206 |
| 6,823,351 | B1 * | 11/2004 | Flood et al. ............... | 707/206 |
| 6,826,583 | B1 * | 11/2004 | Flood et al. ............... | 707/206 |
| 6,934,741 | B1 * | 8/2005 | Shavit et al. ............. | 709/214 |
| 2002/0120663 | A1 * | 8/2002 | Binns ......................... | 709/103 |
| 2003/0005025 | A1 * | 1/2003 | Shavit et al. ............. | 709/102 |
| 2003/0005029 | A1 * | 1/2003 | Shavit et al. ............. | 709/107 |
| 2003/0005114 | A1 * | 1/2003 | Shavit et al. ............. | 709/225 |
| 2004/0064814 | A1 * | 4/2004 | Bowers et al. ............ | 718/100 |

OTHER PUBLICATIONS

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

(Continued)

*Primary Examiner*—Hong Kim
(74) *Attorney, Agent, or Firm*—Kudirka & Jobse, LLP

(57) ABSTRACT

A computer system employing a plurality of concurrent threads to perform tasks that dynamically identify further similar tasks employs a double-ended queue ("deque") to list the dynamically identified tasks. If a thread's deque runs out of tasks while other threads' deques have tasks remaining, the thread whose deque has become empty will remove one or more entries from another thread's deque and perform the tasks thereby identified. When a thread's deque becomes too full, it may allocate space for another deque, transfer entries from its existing deque, place an identifier of the existing deque into the new deque, and adopt the new deque as the one that it uses for storing and retrieving task identifiers. Alternatively, it may transfer some of the existing deque's entries into a newly allocated array and place an identifier of that array into the existing deque. The thread thereby deals with deque overflows without introducing additional synchronization requirements or restricting the deque's range of use.

113 Claims, 18 Drawing Sheets

OTHER PUBLICATIONS

Grarup and Seligmann, "Incremental Mature Garbage Collection," M.Sc. Thesis, Available at http://www.daimi.au.dk/~jacobse/Papers/.

Seligmann and Grarup, "Incremental Mature Garbage Collection Using the Train Algorith," Proceedings of ECOOP '95, Ninth European Conference on Object-Oriented Programming, 1995, http://www.daimi.au.dk/~jacobse/Papers/.

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, Apr. 4, 1978, pp. 280-294.

Appel, Ellis, and Li, "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct. 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

Arora, Blumofe, and Plaxton, "Thread Scheduling for Multiprogrammed Multiprocessors," Proceedings of the Tenth Annual ACM Symposium on Parallel Algorithms and Architectures, Jun. 1998.

Douglas W. Clark, "An Efficient List-Moving Algorithm Using Constant Workspace," Communications of the ACM, Jun. 1976, pp. 352-354, vol. 19, No. 6.

C. J. Cheney, "A Nonrecursive List Compacting Algorithm," Communications of the ACM, Nov. 1970, pp. 677-678, vol. 13, No. 11.

Goldstein, Schauser, and Culler, "Lazy Threads: Implementing a Fast parallel Call," Journal of Parallel and Distributed Computing, Aug. 1996, pp. 5-20, vol. 37, No. 1.

Wulf, Shaw, Hilfinger, and Flon, "Fundamental Structures of Computer Science," Addison-Wesley, 1981, pp. 233-236, 275-281.

Blumofe and Papadopoulos, "Hood: A User-level Thread Library for Multiprogramming Multiprocessors," The University of Texas at Austin, Aug. 1998.

Flood, Detlefs, Shavit, and Zhang, "Parallel Garbage Collection for Shared Memory Multiprocessors," Usenix Java Virtual Machine Research and Technology Symposium (JVM 2001) Apr. 2001.

* cited by examiner

```
1  void *popTop(Deque *deq) {
2    int localTop = deq->top;
3    int localBottom = deq->bottom;
4    int newTop;
5    void *res;
6
7    while ((newTop = deq->top) != localTop) {
8      localTop = newTop;
9      localBottom = deq->bottom;
10   }
11
12   if (isEmpty(localBottom, localTop))
13     return DEQ_EMPTY;
14
15   res = deq->closures[localTop & mask];
16   newTop = localTop + 1;
17
18   if (cas(newTop, localTop, &deq->top) == localTop)
19     return res;
20   return DEQ_FAIL;
21 }
```

FIG. 7

```
1  void *pushBottom(Deque *deq, void *closure) {
2      int localBottom = deq->bottom;
3      int localTop = deq->top;
4      if (isFull(localBottom, localTop))
5         return DEQ_FULL;
6      localBottom ++;
7      deq->closures[localBottom & mask] = closure;
8      deq->bottom = localBottom;
9      return closure;
10 }
```

FIG. 9

```
1  #define k            (4)
2  #define j            (1)
3  #define gap_plus_one(k + 1 + 1)
4  #define log_m        (7)
5  #define m            (1 << log_m)
6  #define mask         (m - 1)
7  #define DEQ_EMPTY    (void *)(0)
8  #define DEQ_FULL     (void *)(1)
9  #define DEQ_FAIL     (void *)(2)
10 #define DEQ_SUCCESS  (void *)(3)
11
12 typedef struct {
13 int top;
14 int bottom;
15 void **closures;
16 } Deque;
17
18 static unsigned num_less_one(int bottom, int top) {
19    return (bottom - top) & mask;
20 }
21
22 static int diff(int bottom, int top) {
23    return (top - bottom) & mask;
24 }
25
26 static int isFull(int bottom, int top) {
27    return diff(bottom, top) == gap_plus_one;
28 }
29
30 static int isEmpty(int bottom, int top) {
31    return num_less_one(bottom, top) > (m - gap_plus_one);
32 }
```

FIG. 8

```
1   void *popBottom(Deque *deq) {
2       int localBottom = deq->bottom;
3       int localTop = deq->top;
4       int newTop;
5       unsigned num_1;
6       void *res;
7
8       if (isEmpty(localBottom, localTop))
9           return DEQ_EMPTY;
10
11      res = deq->closures[localBottom & mask];
12      localBottom --;
13
14      /* Publish the new bottom and recheck top. */
15      deq->bottom = localBottom;
16      store_load_membar();  /* required on sparc TSO */
17      localTop = deq->top;
18
19   /* Can an already underway steal be about to pop res?
20    * If not, return res without contending for it. */
21      num_1 = num_less_one(localBottom, localTop);
22      if (num_1 >= (j - 1) && num_1 <= (m - gap_plus_one))
23          return res;
24
```

FIG. 10A

```
25      newTop = localTop + m;
26
27          /* If that entry may remain unstolen,
28           * contend with potential stealers for it. */
29      if (num_1 < (j - 1) || num_1 == (m - 1)) {
30          int oldTop = cas(newTop, localTop, &deq->top);
31          if (oldTop == localTop)
32              return res;
33          if (j > 1) {
34              num_1 = num_less_one(localBottom, oldTop);
35              if (num_1 < (j - 1) || num_1 == (m - 1))
36                  return res;
37          }
38      }
39
40      deq->bottom = localBottom + 1;
41      return DEQ_FAIL;
42 }
```

FIG. 10B

```
1   void *popBottomN(Deque *deq, int n, void **closures) {
2       int localBottom = deq->bottom;
3       int oldBottom = localBottom;
4       int localTop = deq->top;
5       unsigned num_1 = num_less_one(localBottom, localTop);
6
7       if (n > k || num_1 < (n - 1) || num_1 > (m - gap_plus_one))
8           return DEQ_FAIL;
9
10      while (n -- > 0) {
11          *closures = deq->closures[localBottom & mask];
12          closures --;
13          localBottom --;
14      }
15
16      /* Publish the new bottom and recheck top. */
17      deq->bottom = localBottom;
18      store_load_membar();       /* required on sparc TSO */
19      localTop = deq->top;
20
21      num_1 = num_less_one(localBottom, localTop);
22      if (num_1 >= (j - 1) && num_1 <= (m - gap_plus_one))
23          return DEQ_SUCCESS;
24
```

FIG. 12A

```
25      /* If that entry may remain unstolen,
26       * contend with potential stealers for it. */
27      if (num_1 < (j - 1) || num_1 == (m - 1)) {
28          int newTop = localTop + m;
29          int oldTop = cas(newTop, localTop, &deq->top);
30          if (oldTop == localTop)
31              return DEQ_SUCCESS;
32          if (j > 1) {
33              num_1 = num_less_one(localBottom, oldTop);
34              if (num_1 < (j - 1) || num_1 == (m - 1))
35                  return DEQ_SUCCESS;
36          }
37      }
38
39
40      deq->bottom = oldBottom;
41      return DEQ_FAIL;
42  }
```

FIG. 12B

```
1   void *pushTop (Deque *deq, void *closure)    {
2     int localBottom = deq->bottom;
3     int oldTop = deq->top;
4     int localTop;
5     int newTop;
6
7     if (isFull (localBottom, oldTop))
8         return DEQ_FULL;
9
10    localTop = oldTop - 1;
11    newTop = (localTop & mask) | ((oldTop + m) & ~mask);
12
13    deq ->closures [localTop & mask] = closure;
14    if (cas(newTop, oldTop, &deq->top) == localTop)
15        return closure;
16    return DEQ_FAIL;
17  }
```

FIG. 16

MULTI-THREADED GARBAGE COLLECTOR EMPLOYING CASCADED MEMORY ARRAYS OF TASK IDENTIFIERS TO IMPLEMENT WORK STEALING QUEUES FOR TASK IDENTIFICATION AND PROCESSING

BACKGROUND OF THE INVENTION

1. Field of the Invention

The present invention is directed to keeping track of dynamically discovered tasks in computer systems. It is particularly beneficial in situations in which the loads imposed by such tasks need to be balanced among different execution threads.

2. Background Information

Instances of dynamic task discovery abound. Many occur, for instance, in identifying memory space that can be allocated to data "objects." For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

In the example application by reference to which the invention will be described, memory is allocated to some objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14. Those caches would swap data and instructions with the RAM 14 just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Some computer systems may employ a plurality of processors so that different processes' executions actually do occur simultaneously. Such systems come in a wide variety of configurations. Some may be largely the same as that of FIG. 1 with the exception that they include more than one microprocessor such as processor 11, possibly together with respective cache memories, sharing common read/write memory by communication over the common bus 16.

In other configurations, parts of the shared memory may be more local to one or more processors than to others. In FIG. 2, for instance, one or more microprocessors 20 at a location 22 may have access both to a local memory module 24 and to a further, remote memory module 26, which is provided at a remote location 28. Because of the greater distance, though, port circuitry 28 and 30 may be necessary to communicate at the lower speed to which an intervening channel 32 is limited. A processor 34 at the remote location may similarly have different-speed access to both memory modules 24 and 26. In such a situation, one or the other or both of the processors may need to fetch code or data or both from a remote location, but it will often be true that parts of the code will be replicated in both places.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 3's simple batch-compiler operation, for example. A computer system executes in accordance with compiler object code and therefore acts as a compiler 36. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. In any event, electrical signals transport the instructions that the computer system executes to implement the garbage collector. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 38, which typically operates on input such as mouse clicks, etc., to generate a display or some other type of output. This object code implements the relationship that the programmer intends to specify by his application source code. In one approach to garbage collection, the compiler 36, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of hardware that lends itself particularly to use in garbage collection. So even a very simple system may disperse the garbage-collection mechanism over a number of computer-system layers.

To get some sense of the variety of system components that can be used to implement garbage collection, consider FIG. 4's example of a more complex way in which various levels of source code can result in the machine instructions that a processor executes. In the FIG. 4 arrangement, the human applications programmer produces source code 40 written in a high-level language. A compiler 42 typically converts that code into "class files." These files include routines written in instructions, called "byte code" 44, for a "virtual machine" that various processors can be software-configured to emulate. This conversion into byte code is almost always separated in time from those code's execution, so FIG. 4 divides the sequence into a "compile-time environment" 46 separate from a "run-time environment" 48, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 50. That process emulates a virtual machine from whose instruction set the byte code is drawn. As is true of the compiler 42, the virtual-machine process 50 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 4 depicts the virtual machine as including an "interpreter" 52 for that purpose. In addition to or instead of running an interpreter, many virtual-machine implementations actually compile the byte codes concurrently with the resultant object code's execution, so FIG. 4 depicts the virtual machine as additionally including a "just-in-time" compiler 54.

The resultant instructions typically invoke calls to a run-time system 56, which handles matters such as loading new class files as they are needed, and it will typically call on the services of an underlying operating system 58. Among the differences between the arrangements of FIGS. 3 and 4 in that FIG. 4's compiler 40 for converting the human programmer's code does not contribute to providing the garbage-collection function; that results largely from the virtual machine 50's operation.

Independently of the particular collector configuration, garbage collection involves performing tasks that the collector discovers dynamically. Since an object referred to by a reference in a reachable object is itself considered reachable, a collector that discovers a reachable object often finds that it has further work to do, namely, following references in that object to determine whether they refer to further objects. Other types of programs also involve dynamically discovered tasks.

Dynamically discovered tasks often cannot be performed as soon as they are discovered, so the program has to maintain a list of discovered tasks that have not been performed yet. This raises an overflow problem, because it cannot be known in advance how much memory to allocate to the task list.

Solving the overflow problem can be complicated if concurrent operations are involved. Modem computer systems provide for various types of concurrent operation. A user of a typical desktop computer, for instance, may be simultaneously employing a word-processor program and an e-mail program together with a calculator program. As was mentioned above, the user's computer can be using several simultaneously operating processors, each of which can be operating on a different program.

A desktop computer more typically employs only a single main processor, and its operating-system software causes that processor to switch from one program to another rapidly enough that the user cannot usually tell that the different programs are not really executing simultaneously. The different running programs are usually referred to as "processes" in this connection, and the change from one process to another is said to involve a "context switch." In a context switch one process is interrupted, and the contents of the program counter, call stacks, and various registers are stored, including those used for memory mapping. Then the corresponding values previously stored for a previously interrupted process are loaded, and execution resumes for that process. Processor hardware and operating-system software typically have special provisions for performing such context switches.

A program running as a computer-system process may take advantage of such provisions to provide separate, concurrent "threads" of its own execution. Switching threads is like switching processes: the current contents of the program counter and various register contents for one thread are stored and replaced with values previously stored for a different thread. But a thread change does not involve changing the memory-mapping values, as a process change does, so the new thread of execution has access to the same process-specific physical memory as the same process's previous thread.

In some cases, the use of multiple execution threads is merely a matter of programming convenience. For example, compilers for various programming languages, such as the Java programming language, readily provide the "house-keeping" for spawning different threads, so the programmer is not burdened with all the details of making different threads' execution appear simultaneous. In the case of multiprocessor systems, though, the use of multiple threads affords speed advantages. A process can be performed more quickly if the system allocates different threads to different processors when processor capacity is available.

To take advantage of this fact, programmers often identify constituent operations within their programs that particularly lend themselves to parallel execution. When a program reaches a point in its execution at which the parallel-execution operation can begin, it starts different execution threads to perform different tasks within that operation.

In a garbage collector, for example, the initial, statically identifiable members of the root set can be divided among a plurality of threads (whose execution will typically be divided among many processors), and those threads can identify reachable objects in parallel.

Now, each thread could maintain a list of the tasks that it has thus discovered dynamically, and it could proceed to perform all such tasks. But much of the advantage of parallel processing may be lost if each thread performs only those tasks that it has itself discovered. Suppose, for example, that one thread of a garbage collector encounters many objects that contain a lot of references but that others do not. This leaves one thread with many more tasks than the others. There could therefore be a significant amount of time during which that thread still has most of its tasks yet to be performed and the others have finished all of theirs.

To avoid the resultant idle time, such parallel-execution operations are usually so arranged that each thread can perform tasks that other threads have identified. To accomplish this, different threads must be given access to some of the same task lists, and this means that their access to those lists must be synchronized to avoid inconsistency or at least duplication. Between an operation in which a first thread reads a pointer to the next list entry and the operation in which it reads that entry, for example, a second thread may read that entry and proceed to perform the task that it specifies. In the absence of provisions to the contrary, the first thread may then repeat the task unnecessarily.

Synchronization provisions employed to prevent such untoward consequences usually involve atomically performing sets of machine instructions that are otherwise performed separately. Particularly in the multiprocessor systems in which parallel execution is especially advantageous, such "atomic" operations are expensive. Considerable work has therefore been done to minimize the frequency of their use.

One approach is described in a paper by Arora et al. in the 1998 *Proceedings of the Tenth Annual ACM Symposium on Parallel Algorithms and Arichectures* entitled "Thread Scheduling for Multiprogrammmed Multiprocessors." That technique employs a deque, i.e., a double-ended queue: access to the queue is afforded at both ends. In the Arora et al. technique, each deque is associated with a single thread, which alone can add, or "push," entries onto the deque. This "owner" thread pushes and retrieves, or "pops," entries onto and from an end of the deque arbitrarily referred to as its "bottom," while any other, "stealer" thread is restricted to popping entries, and only from the other, or "top" end of the deque. Now, these stealer-thread accesses all involve atomic operations. But most deque accesses are performed by the deque's owner, and, as will be seen in due course, the owner thread can avoid using atomic operations for pushing or, in most cases, popping.

Left untreated in the Arora et al. paper is how to deal gracefully with overflows of the memory arrays that contain the deques' entries. An elegant approach to dealing with this problem in the context of some garbage collectors is set forth in U.S. patent application Ser. No. 09/697,729, which was filed on Oct. 26, 2000, by Flood et al. for Work-Stealing Queues for Parallel Garbage Collection, now U.S. Patent No. 6,823,351. That approach is applied to garbage-collection tasks of the type described above, namely, that of identifying objects reachable from other reachable objects. In the context of a copying collector, this involves evacuating to a to space those objects in a from space that are referred to by references located outside the from space. When a thread evacuates an object that contains references, it may thereby identify new tasks to be performed, namely, the evacuation of any from-space objects to which references in the evacuated object refer. Such an evacuated object thus represents a further task, so the entries in the deque can be object identifiers, which typically take the form of pointers to those objects.

In the environment to which the Flood et al. application is directed, the object format includes a class field, i.e., a field that identifies the class of which the object is an instance. The Flood et al. application, which is hereby incorporated by reference, describes a way of using those fields to thread an object list to which objects are added when the space allocated to the thread's task list has been exhausted.

Although the Flood et al. approach is well suited to its intended environment, it is specific to a particular type of task, and its temporary obliteration of the objects' class fields prevents its use in a collector that operates concurrently with the "mutator," i.e., with the part of the program that actually uses the objects. Moreover, it can make parsing the heap difficult or impossible. And it employs a lock to guard its overflow lists.

SUMMARY OF THE INVENTION

We have developed a way of dealing with array overflow that can be employed in a wider range of applications and that can be used in way that requires no additional synchronization. In accordance with the invention, the array that contains a thread's deque or other task list can also store an identifier of a further list implemented in different array. When a thread retrieves an entry from its or some other thread's task-list-containing array, it determines whether that entry is an identifier of a task or is instead an identifier of a further list. If the entry is a task identifier, of course, the thread simply performs the task thus identified. If the entry is a list identifier, on the other hand, the thread instead turns to the thereby-identified array to find an identifier of a task to be performed.

There are several ways for threads to place such list identifiers in the arrays and thereby deal with overflows. In one approach, if a thread finds that the array containing the items in its task list is full, it allocates a new array, into which it places an identifier of the array in which it had previously been placing task identifiers. Typically, it will also transfer some task identifiers from the previous array to the new array.

While the owner thread is in the process of allocating the new array and filling it, any threads that are in the process of stealing identifiers from the previous array proceed in the normal manner. When the owner thread has placed the array pointer and other entries into the new array, it adopts the list that the new array thereby contains as the one of which it is the owner. Subsequent stealer threads then pop entries from the list in the new array. If, as is typical, the lists are accessed as deques and the owner has placed the identifier of the previous array at the top of the deque, then the first stealer will encounter a list identifier, and it can adopt the deque in that array as the one of which it is the owner. The way in which it thereby obtains access to the overflow is essentially the same as the one in which it obtains access to regular ones; no locking is necessary.

Another approach also involves allocating a new array, but in this approach the owner thread transfers only entries from its existing array to the new one; it does not put an identifier of the existing array in the new one or adopt the new array as the one of which it is the owner. Instead, it places an identifier of the new array in its existing one. Typically, the list contained in the existing array will be accessed as a deque, and the owner thread will place an identifier of the new array at the top of the deque that the old array contains. Again, a stealer can obtain access to overflow entries without locking.

BRIEF DESCRIPTION OF THE DRAWINGS

The invention description below refers to the accompanying drawings, of which:

FIG. 7 is a listing of an example routine for popping entries circularly from the top of a deque;

FIG. 8 is a listing of various definitions and routines employed by routines listed in other drawings;

FIG. 9 is a listing of a routine for circularly pushing entries on the deque's bottom;

FIGS. 10A and 10B together form a listing of a routine for a circularly popping entries from the deque's bottom;

FIGS. 12A and 12B together form a listing of a routine that employs only a single test for interference in the course of popping a plurality of entries from the bottom of the deque;

FIG. 16 is a listing of an example routine for pushing entries circularly onto the top of a deque;

DETAILED DESCRIPTION OF AN ILLUSTRATIVE EMBODIMENT

The present invention's approach to accommodating overflow most benefits applications in which loads must be balanced among threads performing one or more parallelized operations, in which the operations can themselves be broken down into respective sets of tasks (possibly of varying kinds), and in which these tasks arise dynamically while the operations are being performed. An entry in a thread's task list may represent a data structure—for example, network packets or messages in a queue waiting to be sent or received—that the thread is to process, or it may represent some specific function for a thread to perform. For the sake of concreteness, we consider here a single, garbage-collection operation: identifying reachable objects in a collection region of the heap. More specifically, we will consider such an operation in a copying collector, in which reachable objects in a from space are identified and evacuated to a to space.

As was mentioned above, this is a type of operation in which the threads thereby discover new tasks dynamically; if a reference contained in a newly evacuated object refers to an object in the from space, then that from-space object will be considered reachable, and it, too, will need to be evacuated from the from space if the from space is to be reclaimed. So evacuated reference-containing objects can be thought of as representing tasks; each has to be scanned for references to the from space, and any from-space objects thereby referred to need to be scanned.

To appreciate why a thread may need to keep lists of such objects, assume a depth-first evacuation order, i.e., an order based on "descendants." Any object referred to by a reference in an evacuated object is considered a descendant of that evacuated object, as is any descendant of any of that evacuated object's descendants. In a depth-first evacuation, all of an evacuated object's descendants are evacuated before any other objects are. Therefore, if an evacuated object has a plurality of references to from-space objects, the thread must turn to evacuating the first such referred-to object but must also remember to come back to the reference-containing object to identify other referred-to objects that may need evacuation. The thread may therefore place in a list an identifier of an evacuated object whose references to from-space objects have not all been processed, or it may place into the list identifiers of the not-yet-evacuated objects to which the evacuated object's references refer.

Figure 1:
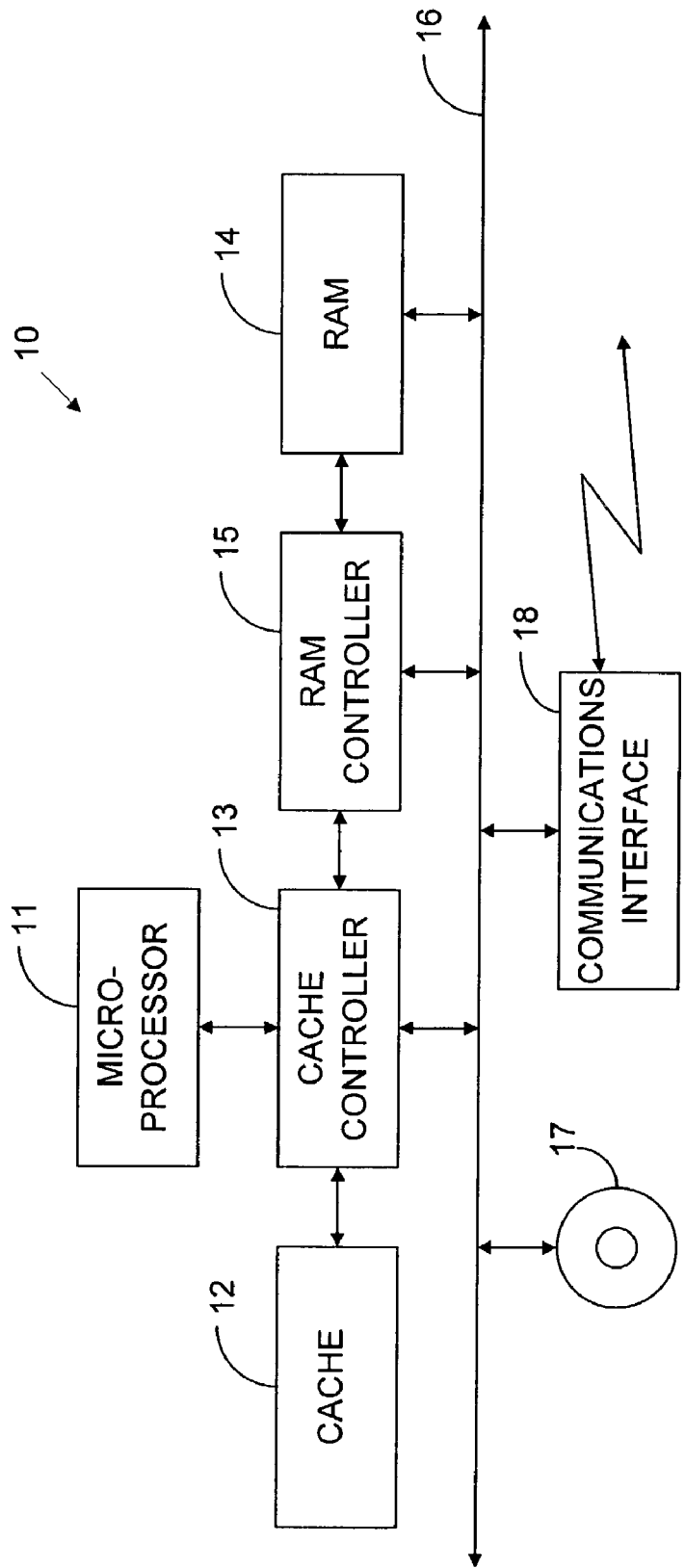
FIG. 1 is a block diagram of a typical uniprocessor computer system.
Figure 2:
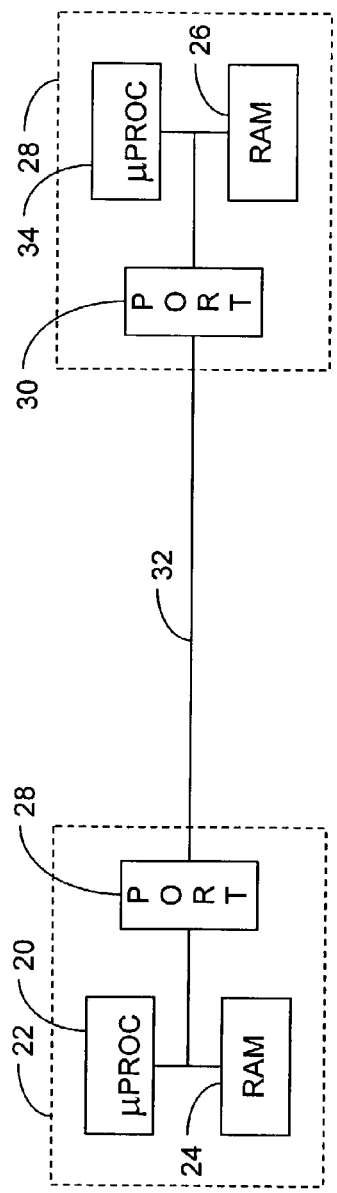
FIG. 2 is a block diagram of one type of multiprocessor computer system.
Figure 3:
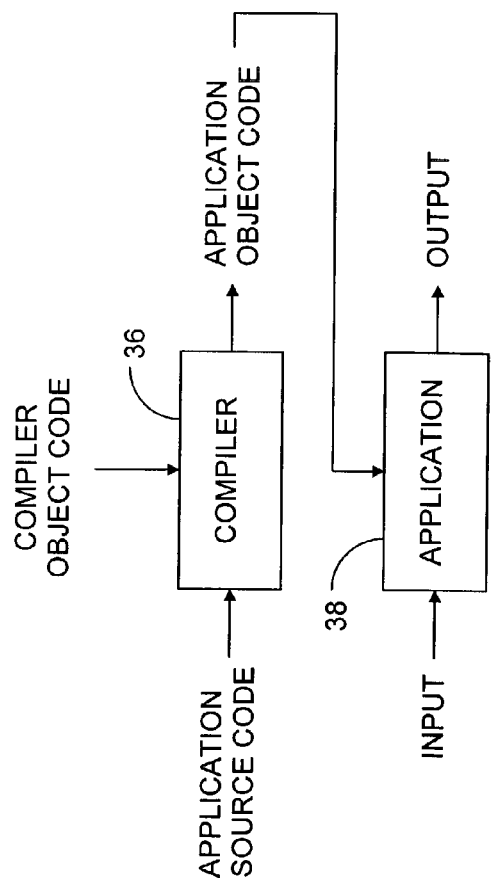
FIG. 3 is a block diagram that illustrates a relationship between source code and object code.
Figure 4:
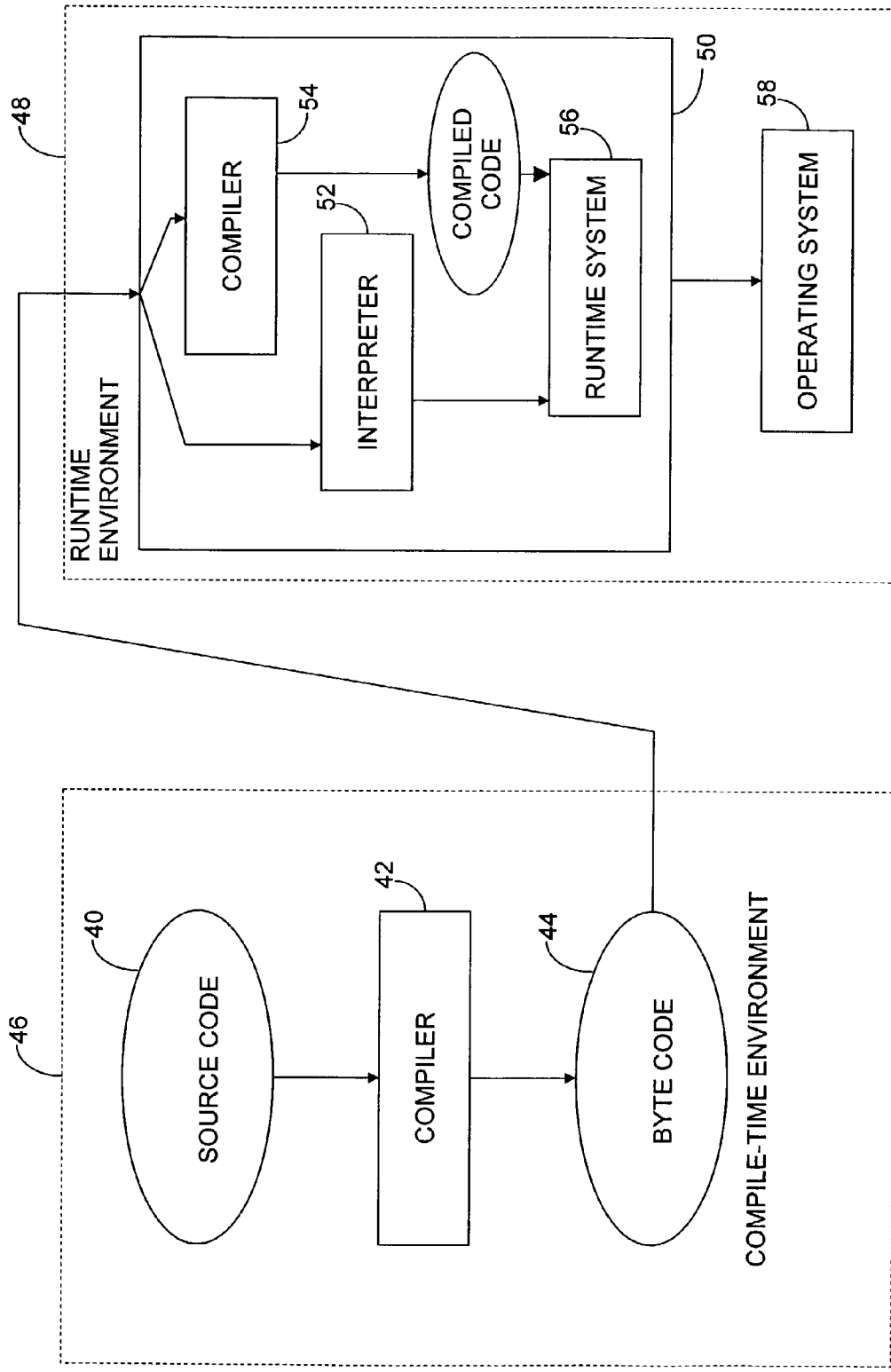
FIG. 4 is a block diagram of a more-complicated relationship between source code and object code.
Figure 5:
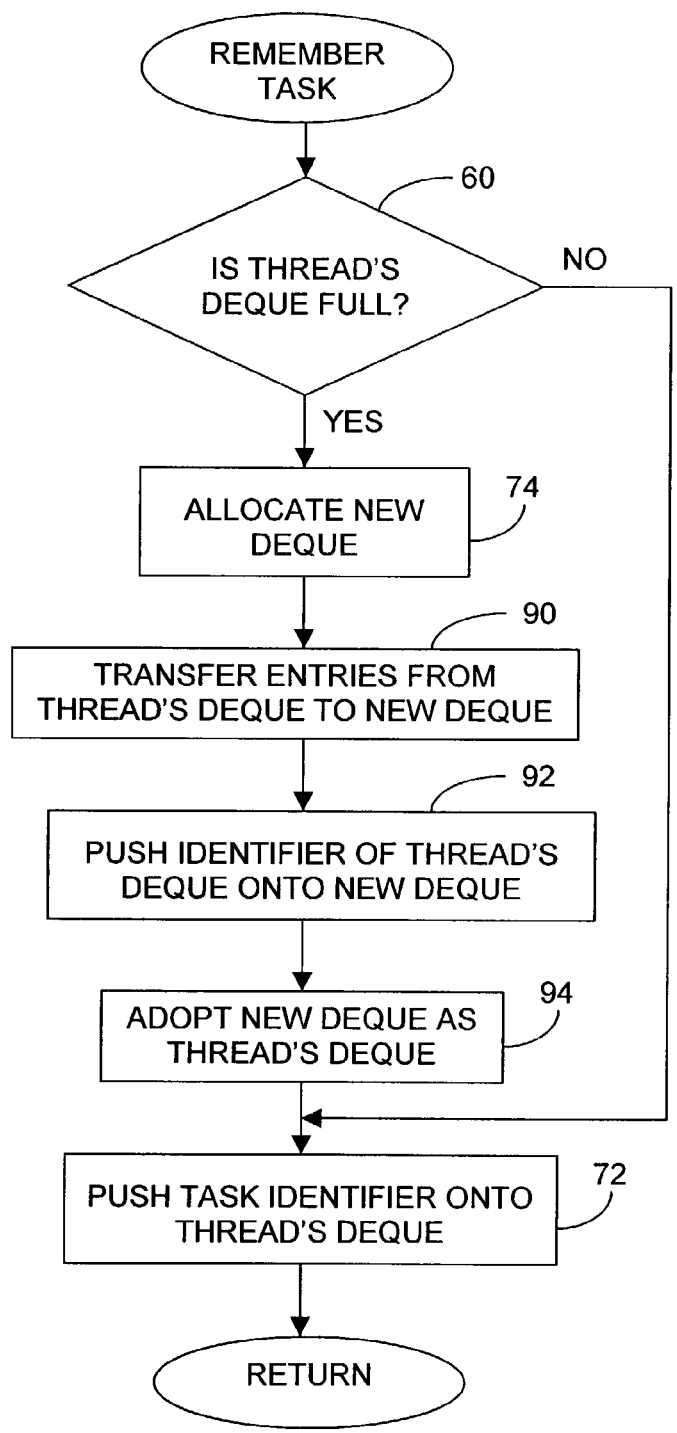
FIG. 5 is a flow chart of one type of task-storage routine that a computer system employing the present invention's teachings may employ.

Let us assume for the sake of concreteness that each thread employs the former approach, that each thread has a task list associated with it, and that the list is accessed as a deque to facilitate stealing. To place a task identifier (which, in this case, takes the form of an object identifier) into its own list, a thread may, for example, perform a routine of the type that FIG. 5 depicts.

As block 60 indicates, the thread first determines whether the deque of which it is the owner is too full. To explain what full means in the illustrated embodiment, we digress at this point to a discussion of consider how that embodiment accesses its deques.

Figure 6:
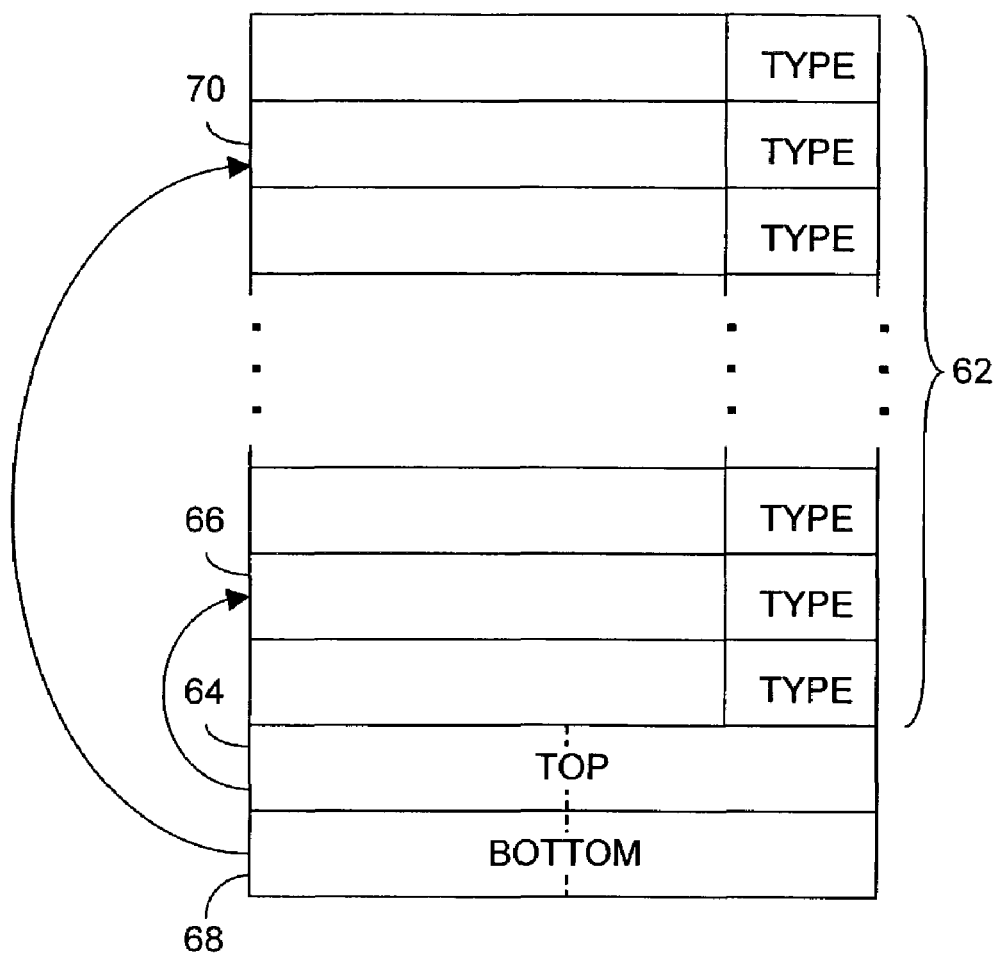
FIG. 6 is a block diagram that illustrates a data structure containing a deque and metadata employed for the deque.

The deque entries are stored in an array of adjacent memory locations, as FIG. 6's array 62 of memory locations in intended to indicate. We will assume for the sake of concreteness that the array allocated to the deque has m such locations (although, as will be seen in due course, not all of those locations can hold task identifiers at the same time). The deque's array is accessed in a double-ended manner. Most approaches to deque implementation associate with each deque a top- and a bottom-index indicator used by access routines to determine where the next top or bottom access should occur. For the sake of simplicity, FIG. 6 depicts the top and bottom indicators as being located immediately adjacent to the deque's array itself, although this arrangement is not at all necessary.

To appreciate the double-ended nature of deque use, we will consider both the pushing operation performed by the deque's owner and the popping operations respectively performed by the owner and other threads. Those other threads pop entries from the deque's top end, whereas the owner thread usually performs its pushing and popping at the deque's bottom end.

Let us first consider the top-popping operation that a stealing thread may perform. Let us assume for this purpose that the top pointer 64 points to deque entry 66, while the bottom pointer 68 points to deque entry 70. Entry-index values will arbitrarily be considered to increase in the downward direction, and access will for the sake of example be assumed to progress circularly through a fixed array. So, since the drawing depicts the top index as m-2 and the bottom index as 2, the illustrated deque is considered to have entries in the locations bearing indexes m-2, m-1, 0, 1, and 2. (Although the other locations may still contain task identifiers previously placed in them, those identifiers are not "live": they are considered to have been popped already, so the popping routines will not return them, and the pushing routines may write over them.)

FIG. 7 sets forth simplified sample code for a routine, popTop( ), that a stealing thread could use to pop a task from another thread's deque. That subroutine's argument is a pointer to a data structure defined in the twelfth through sixteenth lines of FIG. 8. As those lines indicate, that data structure, called "Deque," contains the metadata associated with a deque. It includes a pointer, "closures," to an array that will contain the deque entries, and it includes top-index and bottom-index indicators, "top" and "bottom," which tell where in the array the top and the bottom of the deque's sequence of live entries are. As FIG. 7's second and third lines indicate, popTop( ) begins by reading those indicators.

If the deque is empty, no entry can be popped from it, so, as FIG. 7's twelfth and thirteen lines indicate, popTop( ) returns a distinguished value indicating that fact if it infers from the top and bottom indicators that the deque is empty. As the fifteenth line indicates, it otherwise reads the entry it will return if no other thread interferes.

However, the twelfth-line test could yield a false-empty indication if the contrary measures set for the in the seventh through tenth lines were not taken. Between the time at which a stealer thread reads the top-index indicator and the time it reads the bottom-index indicator, activity on the part of the owner and other stealers could move the top and bottom enough that the combination of the new top and old bottom values make the deque appear empty even though it is not. To prevent this, the block of the seventh through tenth lines reads the top-index indicator again after reading the bottom-index indicator and, if the top-index-indicator value has changed, keeps reading those indicators until it reads the same top-index-indicator value both before and after it reads the bottom-index indicator.

The top-index indicator read in the second-line step tells which entry to read. But the top-index indicator is not itself the index of that top entry; only its least-significant bits are. Suppose, for example, that the top-index indicator is a thirty-two-bit integer but that the number m of slots in the "closures" array is $2^7=128$, as FIG. 8's fourth and fifth lines indicate. Since there are only 128 slots, an array entry can be specified by only seven of the top-index indicator's thirty-two bits. As FIG. 7's fifteenth line indicates, popTop( ) therefore uses a mask defined in FIG. 8's sixth line to extract the top index, and it reads the entry in the slot identified by that index.

With the return value thus provisionally determined, popTop( ) proceeds to the sixteenth-line operation, in which it determines the value the top-index indicator will assume if the popping operation is successful. Since "upward" in the illustrated embodiment is the direction in which that index decreases, popping a value from the deque will result in its top index's being incremented.

It is at this point that a stealing thread needs to be synchronized with other threads. As was just explained, the thread has read the deque's top-index indicator and has incremented its local copy of that indicator. But writing that incremented value into the Deque structure produces an inconsistent result if some other thread has popped the deque in the interim. So, as FIG. 7's eighteenth line indicates, popTop( ) performs an "atomic" operation, i.e., an operation in which it forces the system to perform without interruption a plurality of operations that can ordinarily be performed separately.

The atomic operation in this case is a so-called compare-and-swap operation, referred to as "cas( )" in FIG. 7's eighteenth line. That operation reads the top-index indicator to determine whether it has remained unchanged since the second- or seventh-line operation. If it has, the cas( ) operation replaces that indicator with the incremented value. Otherwise, the cas( ) operation does not replace it, because a change in the interim means that some other thread has already "claimed" the entry provisionally read in FIG. 7's fifteenth line, so popTop( ) cannot.

Note that the eighteenth-line operation tests for any change at all in top-index indicator, not just for a change in only its least-significant, top-index-indicating bits. This enables popTop( ) to detect other threads' intervening accesses in certain situations in which it otherwise could not. Suppose, for example, that, between a given stealer thread's execution of the second- or seventh-line top-index-indicator-reading operation and that thread's execution of the eighteenth-line test for other threads' intervening accesses, other threads' operations circularly move the array position of the deque's top through an entire circuit of the array's slots, returning it to the slot where it started. If the test were based only on the top index itself, the given stealer thread's execution of popTop( ) would fail to detect the other threads' access. Since that test is based on the entire top-index-indicator value, though, popTop( ) detects their access, because, as is exemplified by FIG. 7's sixteenth line, "wrapping" the top position so that it can return to a previous location results in the "tag" value that the top-index indicator's more-significant bits represent.

Of course, even this test can be defeated if so many intervening circuits through the array occur that the tag, too, returns to its previous value. As will be seen below, moreover, the tag can even be incremented without the top position's being wrapped. For a reason to which we return later, though, many environments to which this technique can be applied can guarantee that the number of values through which other threads can advance a tag while a given thread performs a single execution of one of the illustrated access routines will never be high enough to make the tag repeat a value. And there are well-known techniques, such as that described in Moir, "Practical Implementations of Non-Blocking Synchronization Primitives" *ACM PODC* 1997, by which the tag can be used to ensure that other threads' accesses do not go undetected even if such a guarantee cannot be made.

The cas( ) operation's return value is the value that it reads. As the eighteenth and nineteenth lines indicate, popTop( ) returns the deque entry read in the fifteenth-line operation if the cas( ) operation's return value indicates that the top-entry indicator had not changed. As the twentieth line indicates, it otherwise returns a value indicating that the pop operation failed.

Now, using the cas( ) operation is expensive, so popTop( ) is, too. For the most part, though, popTop( ) is required only by (typically infrequent) stealing operations; in most embodiments, they are the only ones that employ a top-popping routine. As the pushBottom( ) listing in FIG. 9 indicates, there is no need for an atomic operation in the more-frequent bottom-pushing routine, which only the deque's user performs.

As that listing's second through fifth lines indicate, that routine begins by reading the bottom- and top-index indicators, determining from their values whether the deque is full, and returning a deque-full value if it is. In most cases, of course, it is not full. As the sixth through ninth lines indicate, the pushing operation in those cases simply involves writing the new deque entry below the location identified by the bottom index, incrementing the bottom-index indicator, and returning a valid pointer value to indicate that the bottom-pushing operation was successful. The reason why this routine requires no atomic operations is that the owner thread is the only one that pushes entries onto the deque, and this routine never pushes entries onto the top, where other threads' accesses occur.

Ordinarily, the routine for popping entries from the bottom requires no atomic operations, either. Since bottom-popping occurs at the same location as top-popping when only one live entry remains, though, it does employ an atomic operation, but only when that specific situation may occur. FIG. 10, which is a listing of a bottom-popping routine, popBottom( ), illustrates this.

FIG. 10's second and third lines indicate that popBottom( ) starts, as the other access routines do, by reading the top- and bottom-index indicators. As its eighth and ninth lines indicate, it returns a deque-empty-indicating value if it infers from those indicators' values that the deque is empty. Otherwise, it reads the bottom deque entry, as the eleventh line indicates.

As the fifteenth line indicates, it then updates the bottom-index indicator to reflect the erstwhile bottom entry's removal. Among other things, this prevents a stealer thread that thereafter begins the top-popping routine from returning the deque entry that the owner just read. But a stealer that has already begun that routine may have read the bottom-index indicator before the bottom-popping thread updated it, so such a stealer's execution of the top-popping routine can still return that deque entry. If it does, the bottom-popping routine should not.

Ordinarily, though, the bottom is far enough from the top that the top entry popped by a stealer cannot also be the bottom entry. To determine whether this state prevails and popBottom( ) can therefore simply return the deque entry it has read—i.e., can avoid performing expensive synchronization—it performs operations set forth in the seventeenth, twenty-first, and twenty-second lines.

Now, if there is any stealer that read the bottom-index indicator before popBottom( ) claimed the bottom deque entry by updating that indicator's value—and that can therefore potentially pop the bottom value that popBottom( ) is attempting to pop—the value of the top-index indicator that popBottom( ) obtains by re-reading that indicator in the seventeenth-line step is the lowest (i.e., the lowest-entry-count-indicating) value on which such a stealing thread can successfully have based its execution of the top-popping routine. The twenty-first- and twenty-second-line steps therefore use this value to determine whether further, synchronization steps are necessary.

To understand that determination, it helps to consider further aspects of circular deque accesses, the top and bottom indicators, and the criteria employed by the illustrated embodiment's various deque-access routines to determine whether the deque is empty. We begin with the top and bottom indicators.

The use of top-index and bottom-index indicators in the illustrated manner is but one way of managing deques, and the present invention's teachings do not require it. In some other deque implementations, for example, a bottom index identifies the location of the bottom entry, as the illustrated embodiment's bottom index does, but a top index identifies the location to which the next entry should be pushed, not the location of the existing top entry. Another alternative is just the reverse: a top index identifies the location of the top entry, while a bottom index identifies the location where bottom pushing should next occur. Indeed, the deque's metadata need not include explicit top and bottom indexes at all. The ends of the live-location sequence may instead be inferred from a number-of-entries value and a deque pointer that points to one of the ends of the live-location sequence rather than to an end of the deque's memory space. (In that case, the memory space's borders could be inferred, for example, from alignment considerations.) As was explained above, though, the approach exemplified by the drawings' access routines uses top and bottom indexes that respectively identify the locations of the top and bottom entries, and top and bottom are defined in such a manner that indexes increase in the downward direction. In such an arrangement, the top and bottom indexes are the same when there is only a single entry, the top-index value is one less than the bottom-index value when there are two entries, and so on: subtracting the bottom index from the top index yields a value one less than the number of entries. But the array access proceeds circularly in the illustrated embodiment, so the subtraction must be circular—i.e., modulo the number of array slots—and this raises a question of interpretation.

Specifically, if the top index's value is one greater than the bottom index's, circular subtraction yields a value one less than the number of slots, so the just-stated rule implies a full queue. But then decrementing the top index by one yields equal index values, and this results in a single-entry indication, as was just mentioned. So the question is, What values represent an empty queue?

The normal way of dealing with this problem is for the access routines not to permit all array slots to contain live entries at the same time, i.e., for those routines to maintain a gap of at least one empty slot at all times. If this is done, a top-index value one greater than the bottom-index value can be taken to mean an empty queue.

The illustrated embodiment uses this approach but requires a gap of more than one slot, as FIG. 8's isFull( ) and isEmpty( ) routines show. Instead of enforcing a single-slot gap, they enforce a gap that is equal to k+1, where k is the maximum number of entries the owner may pop from the deque with only one check for interference. Since popBottom( ) pops only one entry at a time, k could be unity if popBottom( ) were the only bottom-popping routine. But a further bottom-popping routine, to be described below, pops as many as four entries at a time: k's value is four.

To understand why those routines enforce a larger gap, consider a scenario in which the owner employs FIG. 10's popBottom( ) routine at a time when the values of the top and bottom indexes are both five. This means that a single entry does remain to be popped, so the owner thread performs the eleventh-, twelfth-, and fifteenth-line operations of reading the bottom entry and raising the bottom of the live-entry sequence. As a result, the bottom index changes from five to four. To check for the possibility of interference from a stealer thread, that routine re-reads the top-index indicator, as the seventeenth line indicates, and then performs the twenty-first- and twenty-second-line operations of determining whether the top was low enough that a stealer thread's top popping could pop the bottom entry.

The twenty-first-line step simply obtains the result of circularly subtracting the top index from the bottom index. This results in a value that, unless it falls in the gap, is one less than the number of live deque entries. To determine whether interference is possible, the twenty-second-line step imposes two conditions. The first condition is that the just-computed difference between the top and bottom indexes exceed a minimum. The second condition is that it not fall within the gap.

The first condition is based on the assumption that top-popping routines are restricted to popping no more than j entries at a time. It is also based on the assumption that any stealer's top-popping routine will, as popTop( ) does, read the top-index value before it reads the bottom-index value. It follows from the latter assumption that any successful stealer's execution of a top-popping routine will either (1) read the new bottom index or (2) have read a top index associated with a slot at least as far above the bottom slot as the slot with which the just-read top index is associated.

In the former case, the stealer will avoid popping the entry that popBottom( ) is attempting to pop; it knows where the new bottom is. In the latter case, it will avoid popping an entry lower than (whose index is higher than) the one whose index equals the newly read top index plus j−1. The twenty-second line's first condition, namely, that the result of the twenty-first-line step is greater than or equal to j−1, therefore ordinarily means that too many live entries remain for the entry just read by popBottom( ) to be popped by a stealer thread that has not read the updated bottom index.

As was explained above, though, a value at the upper end of the range of differences between the top and bottom indexes has been reserved to mean that the deque actually is empty, not full. So the second condition imposed by the twenty-second-line operation is that the result not be in the empty-indicating gap at the top of its range. The reason for the illustrated embodiment's requirement that this gap be more than a single slot can be appreciated by contrasting two possible outcomes of the seventeenth-line, top-index-re-reading step.

First suppose that the bottom- and newly observed top-index values are four and five, respectively: the newly observed top has remained where it was when popBottom( ) concluded that there was one live entry left, so it is one below the slot to which popBottom( ) raised the bottom to indicate that it had popped that remaining entry. Evaluating the twenty-second line's second condition would correctly reveal that the deque is empty even if only the single-slot gap required to prevent ambiguity were imposed, and popBottom( ) would, as it should, proceed to check for interference.

But suppose instead that a stealer thread has been operating at the same time, has also seen that an entry was left, and has popped it by lowering the top index, giving the top index a value of six rather than five: the top is two slots below the bottom, not one. If the twenty-second-line operation enforced only the single-slot gap required to avoid ambiguity—i.e., if gap_plus_one equaled only two-popBottom( ) would conclude that, instead of being empty, the deque is actually full, and it would erroneously conclude that no steps need to be taken to deal with potential interference. The greater gap prevents this.

Now, one might initially think that the need to use a larger gap value for the second condition in popBottom( )'s twenty-second line does not mean that more than one slot at a time actually needs to be kept empty. After all, popBottom( )'s imposing the twenty-second-line condition has enabled it to recognize the steal, so it could simply roll back its bottom-popping operation by returning the bottom to its previous position—now one above the top—and thereby produce a condition that would be recognized as empty. Subsequent executions of popTop( ) could recognize this condition as empty without, one might think, being prevented from popping the top entry when the deque is filled to a point at which the top is two slots below the bottom.

In fact, though, thus rolling back the bottom-popping operation would not be adequate if popTop( ) enforced only a one-slot gap. Suppose, for example, that another stealer thread, executing popTop( ), attempted to pop the deque again before the owner thread rolled back its bottom popping. Since the top would still be two slots below the bottom, the stealer would conclude that the deque is full-and proceed to pop dead values. Enforcing a greater gap enables popTop( ) to avoid this. A gap of only two is adequate if bottom popping is performed only by popBottom( ), which pops only one entry at a time. Since the illustrated embodiment also provides for popping as many as k entries from the bottom at a time, though, the illustrated access routines enforce a gap of k+1 slots.

If the twenty-second-line operation determines that interference is not a possibility, popBottom( ) simply returns the entry it read, as the twenty-third line indicates. Otherwise, it performs the twenty-ninth-line operation to determine whether that entry may nonetheless still be available. If it may be, popBottom( ) executes the thirtieth-line atomic compare-and-swap operation to contend for the entry with the potential stealer, and the thirty-first-line step checks the top-index indicator to determine whether it has been changed by a stealing thread's "claiming" that entry.

Even if the top indicator has been changed, the stealer may not have stolen the particular entry that popBottom( ) is trying to pop. The popBottom( ) routine checks for this possibility by performing the steps of the thirty-third through thirty-fifth lines. If it thereby finds that the no interference has occurred, it returns the read entry, as the thirty-sixth line indicates.

If the twenty-ninth- or thirtieth-fifth-line step finds that a stealing thread has beat popBottom( ) to the entry, popBottom( ) rolls back the bottom popping by restoring the bottom index to its previous value. The thirty-fourth-line step performs that operation, which is followed by the thirty-fifth-line step of returning a failure-indicating value.

If the thirty-first-line operation finds that no stealing has yet occurred, on the other hand, the atomic operation writes a new value into the top-index indicator, and popBottom( ) performs the thirty-second-line step of returning the entry it has read. The top-index-indicator change is performed to ensure that the popTop( ) operation performed by any thread still attempting to steal the now-popped deque entry will see that an interference has occurred and will therefore refrain from returning that entry. But bottom popping should not change the top index itself; the top has not moved. The thirtieth-line atomic operation therefore changes the top-index indicator in a way that does not change the top index itself.

Specifically, the new value of the top-index indicator is instead produced by the twenty-fifth-line step of adding m to the local copy of the top-index indicator. This increments the tag without changing the index itself. In the operation represented by FIG. 7's eighteenth line, the stealing thread detects this change and therefore concludes that it should not perform the task identified by the identifier it just read, even though the top index itself has not changed.

We now return briefly to the above-mentioned guarantee that the tag values would not so repeat as to prevent a top-popping thread from detecting another thread's interference. As was just explained, the top-popping routine is not the only one that increments the tag. Indeed, since the bottom-popping routine's tag incrementing is not restricted to occasions in which the index value overflows, that routine could in theory increment the tag every time the owner thread pops the deque. And a top-pushing routine to be described below increments the tag, too.

But consider the situation in which the illustrated access routines are used in an incremental copying collector. In that environment, there is a limit to how many values threads using the illustrated access routines can advance the tag value through during a single execution of one of those routines by another thread. Specifically, the number of values cannot exceed the number of objects evacuated in a collection increment. And, since the number of possible tag values is $2^{32-7}=2^{25}$ in the illustrated embodiment, limiting a single collection increment to a region in which the number of objects is less than the number of possible tag values is not a severe restriction. So it will often be possible to make the above-mentioned guarantee.

Having discussed the illustrated embodiment's basic deque-access routines, we return to FIG. 5's task-memorialization operation. The test represented by FIG. 5's block 60 is performed by the above-described popBottom( ) routine, which also performs an operation, represented by FIG. 5's block 72, of pushing a task identifier onto the thread's deque if the block-60 operation resulted in a determination that the deque is not full.

Figure 11:
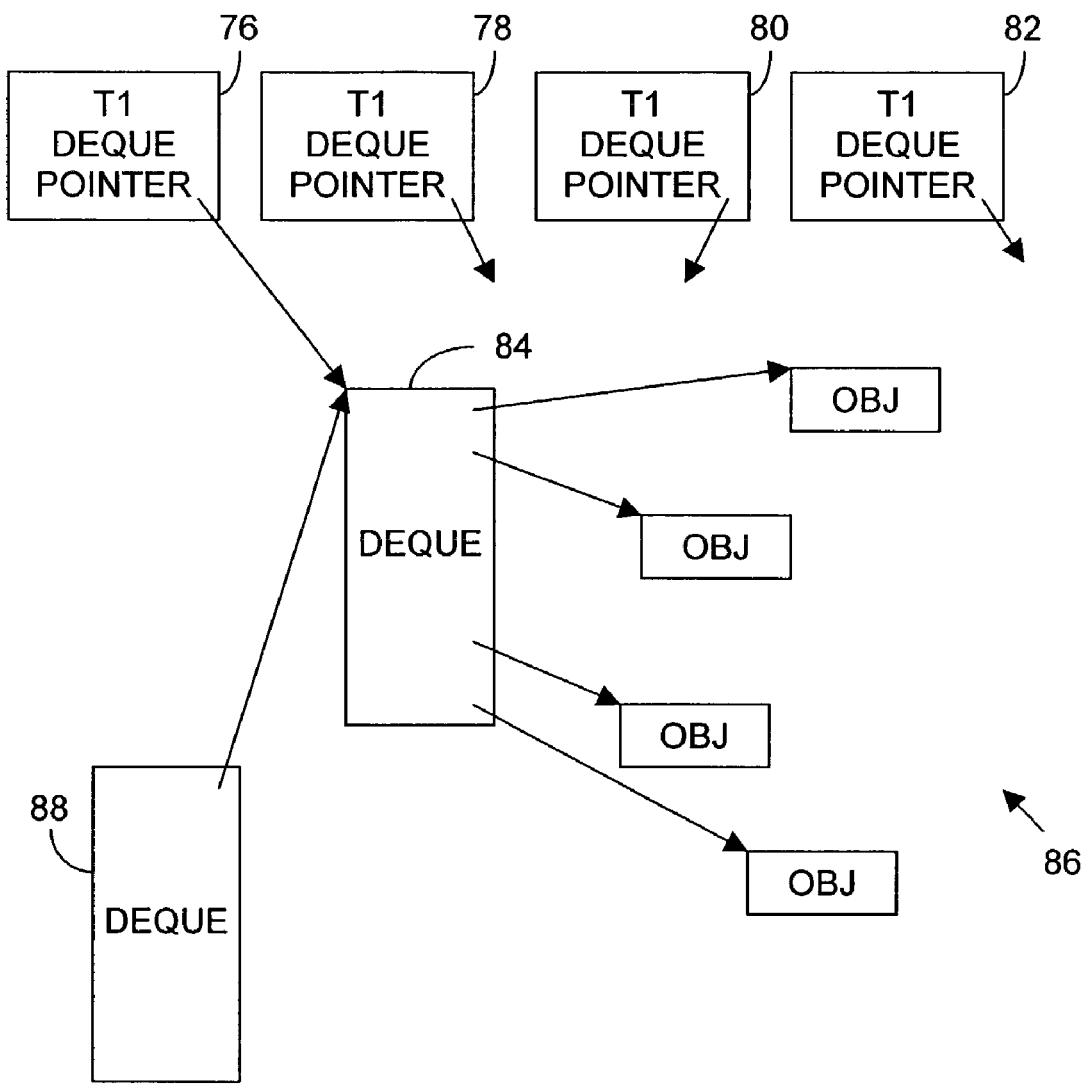
FIG. 11 is a block diagram illustrating the installation of a list identifier as an entry in another deque.

If the deque is full, though, the owner thread allocates a new deque, which will become the deque of which that thread is the owner. Block 74 represents this step, which FIG. 11 illustrates. Let us suppose that respective pointers 76, 78, 80, and 82 in, say, respective threads' execution environments identify the deques those threads use to list tasks that they have discovered. Block 84 represents the deque of which a first thread, T1, is the owner. The entries in that deque are all task identifiers. As was mentioned before, the tasks that they represent are those of scanning various objects for pointers to from-space objects and thereby identifying from-space objects that need to be evacuated to the to space. The task identifiers take the form of values that specify the locations of the objects 86 to be scanned.

When thread T1 discovers new work and finds that the deque 84 of which it is an owner is full, it allocates a new deque 88, as was mentioned above in connection with FIG. 5's block 74. As block 90 indicates, the owner thread then transfers tasks from its current deque into the new deque. Not only does the new deque receive identifiers of individual tasks, but, as block 92 indicates, it also receives as its top entry a list identifier that identifies deque 84.

The reason why a list identifier is pushed onto the new deque together with the task identifiers is that thread T1's execution environment will, as block 94 indicates, eventually be changed to identify deque 88 instead of deque 84 as the one to which thread T1 will add task identifiers and from which other threads will steal tasks. Since thread T1 has placed the list identifier on top of the new deque, that list identifier will be the first deque entry that a stealing thread encounters when deque 84 has been replaced by deque 88.

A perusal of the deque-access routines described above reveals that they can be used for popping not only task identifiers but also list identifiers.

Now, the intention is for a thread that pops such an entry to adopt as its own the deque thereby identified. This is appropriate in the case of stealer thread, because any stealer thread's own deque will be empty. Since the list identifier is at the top of the deque, it is also appropriate for an owner thread, which will therefore encounter a list identifier only when its deque is otherwise empty. In both cases, though, the popping thread must be able to distinguish a deque-identifying entry from a task-identifying entry.

The manner in which the thread does this is not critical, and it may depend on the particular application to which the invention's teachings are applied. Suppose that task identifiers identify objects on which operations will be performed and that the operation to be performed on a particular object is determined from the state of that object, such as its class or type, or on the address range in which the object is allocated. Suppose further that deques' arrays either are structured with the appropriate state or are allocated in a separate part of the address space. For example, suppose that task identifiers take the form of pointers to evacuated objects that need to be scanned for references to objects in the from space. And suppose that a list identifier takes the form of a pointer to a deque's array, or to a metadata structure such as the Deque structure of FIG. 8, that is not in the from space. It is then a simple matter for the popping thread to use deque entries' values to distinguish task identifiers from list identifiers.

Another approach to distinguishing between the two would be to use full-fledged closures as deque entries: the deque entries could be combinations of identifiers of routines to be executed and values to be passed to the routines thus identified. For example, the task identifier could take the form of an identifier of an object-processing routine together with an identifier of the object to be processed by that routine, while the list identifier could identify not only the deque to be adopted but also a routine for adopting it.

But the approach we prefer is instead to employ an explicit type-indicating flag. If objects and arrays are suitably aligned, the least-significant bits are known to be zero and can be replaced by appropriate flags that indicate how the addresses should be treated. This approach can be seen as space-efficiently encoding full-fledged closures, and it is based on the fact that the number of kinds of tasks to be performed is small. It enables us to distinguish between task items and list items as well as among different kinds of task items.

FIG. 6 is intended to represent this situation in which the deque entries' least-significant bits are flags that distinguish task identifiers from list identifiers. Suppose, for example, that there is only a single kind of task to perform on each object and that all objects and deques are known to be double-byte aligned: the least-significant bit of each object or deque address has to be zero. A thread that reads an entry could then mask out the least-significant bit to arrive at the desired pointer, but it would read that bit to distinguish between a deque pointer and an object pointer.

As was mentioned above, most embodiments will not only place a list identifier in the new deque but also transfer some of the old deque's entries to it. Reflection reveals that this is not absolutely necessary; a thread that has just allocated a new deque will in most cases be in the midst of discovering many new tasks whose identifiers it will push onto deque. But initially placing a number of task identifiers in the new deque as a buffer between the bottom of the deque and the list identifier at the deque's top helps if in the process the thread also needs to pop entries back off the new deque. The buffer minimizes the likelihood that alternatively pushing and popping will cause an expensive period of oscillation between the old and new deques.

This initial transfer of task identifiers preferably occurs before the thread adopts the new deque as its task list. In that way, its accesses to the new deque during the initial transfers do not have to be synchronized; the other threads will not yet have access to the new deque. Indeed, with the possible exception of the popping operations used to transfer task identifiers from the old deque to the new one, none of the operations involved in initializing the new deque has any effect on stealing operations that target the old deque; while the owner thread is initializing the new deque, any stealing operations can proceed in the normal manner.

As to the owner thread's popping from the old deque the entries to be transferred to the new deque, FIG. 10's bottom-popping operation can be used to provide any necessary synchronization. But we prefer to expedite the transfer process in such a manner as to reduce the resultant interference checking. FIG. 12 is a listing of a routine for doing so by popping n deque entries at a time.

After reading the bottom- and top-index indicators in the operations set forth in FIG. 12's second and fourth lines and performing the fifth-line operation of determining from those values how many (less one) live entries the deque contains, that routine first determines whether popping n entries at a time is permissible, as the seventh line indicates. The criteria imposed by that line are (1) that the number n of requested entries not be more than the upper limit k used by the other access operations to determine gap size, and (2) that there are at least n entries available in the deque. If either criterion is not met, the FIG. 12 routine returns a distinguished value representing the fact that the attempted access failed.

Otherwise, the routine places the deque's bottom n entries in an array. In the case involved here, where a thread is using the FIG. 12 routine to transfer entries from an old deque to a new deque, the closures parameter passed to that routine is a pointer to a location n slots below the old-list identifier at the top of the new deque, and the location at which each successive entry is placed into the new deque progresses upward from there so as to preserve the entries' order.

As the seventeenth line indicates, the thread then updates the old deque's bottom-index indicator to reflect n entries' removal, thereby publishing their removal to any thread that thereafter attempts to steal from the old deque. Since some stealing threads may have read the bottom-index indicator before the updated value was published, though, the owner re-reads the top-index indicator, as the nineteenth line indicates, and performs the twenty-first- and twenty-second-line steps of determining whether the distance between that top value and the new bottom value enables it to rule out the possibility of interference by any such steals. If so, popBottomN( ) returns a distinguished value whose meaning is that the popping operation was successful, as the twenty-third line indicates. Otherwise, as the remaining lines indicate, it deals with the possibility of interference in the same way that popBottom( ) does.

Figure 13:
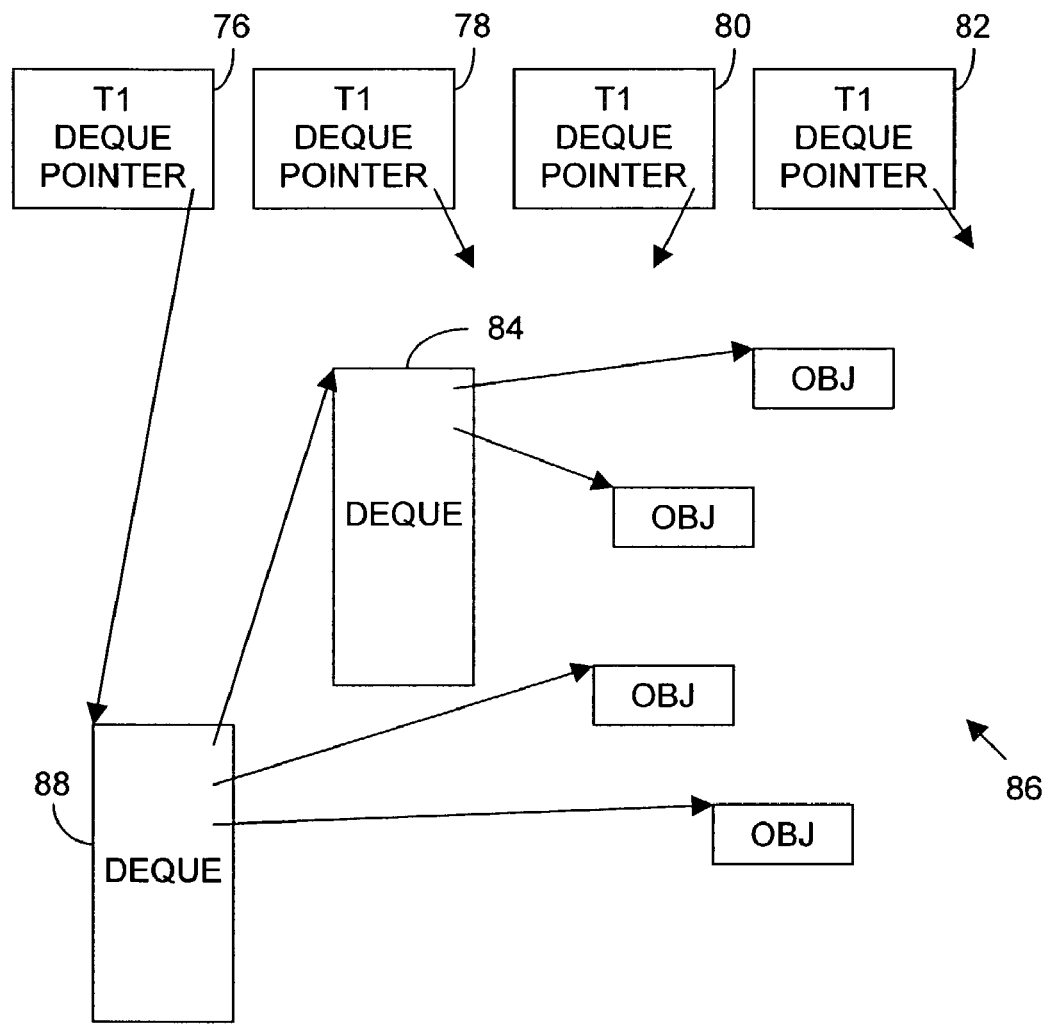
FIG. 13 is a diagram similar to FIG. 11 but illustrating the organization that results after the new deque has received entries from the old deque and has replaced it.

With the new deque thus initialized, the owner thread replaces the previous deque with it, as FIG. 5's block 94 indicates. This typically would involve updating FIG. 11's deque pointer 76, as FIG. 13 illustrates. Either before or after the new deque's adoption, the owner thread pushes onto the new deque an identifier of the task whose discovery triggered that thread's calling the FIG. 5 routine, and the FIG. 5 operation is completed.

Figure 14:
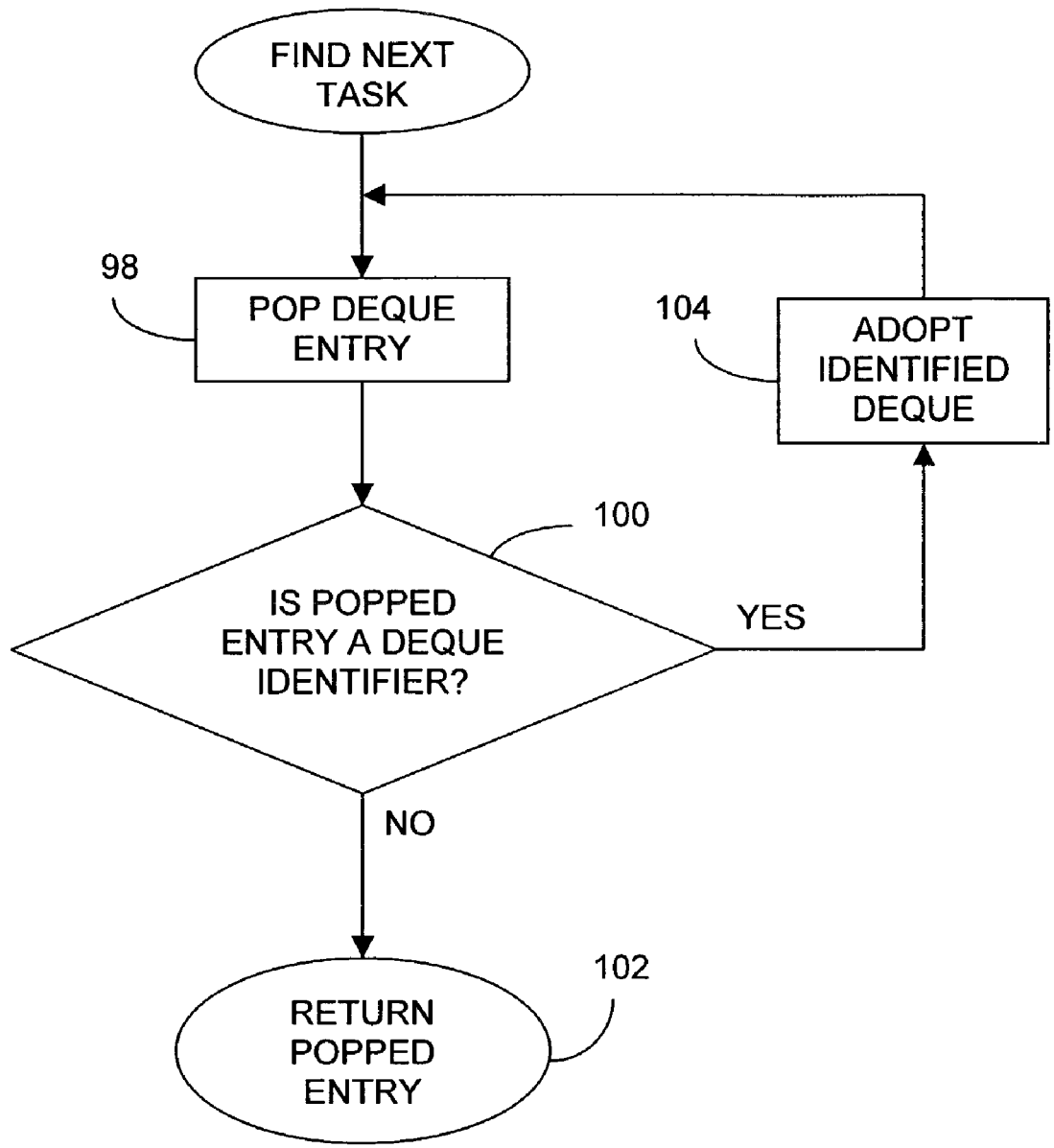
FIG. 14 is a flow chart of a routine for retrieving entries from a deque thus managed.

A thread that is to obtain a task from a deque thus maintained can employ a routine such as the one that FIG. 14 depicts. Block 98 represents popping a deque entry. An owner thread typically performs this popping from the bottom, whereas a stealer thread ordinarily performs it from the top. In both cases, the popping thread then determines whether the entry thus popped is a task identifier or a list identifier, as block 100 indicates. Ordinarily, it is a task identifier, and the routine returns that identifier, as block 102 indicates.

If it is a list identifier, though, the thread adopts the thereby-identified deque as its own deque, as block 104 indicates. As was mentioned above, this is appropriate independently of whether it is the owner or a stealer that is adopting the deque; a stealing thread's current deque will be empty, and an owner thread's current deque will be empty except for that list identifier. Note also that the overflow mechanism has benefited load balancing: since the stealer has obtained many tasks with a single steal, the relatively expensive stealing operation does not have to be performed for each task. Although the illustrated embodiment employs a uniform deque-array size, moreover, some embodiments may enhance the overflow mechanism's load-balancing benefits by varying array sizes.

For example, each new deque's array can be made, say, twice the size of the array that it replaces. Even if an owner thread has amassed a long chain of task deques, a stealer would still tend to steal half the owner's tasks.

Figure 15:
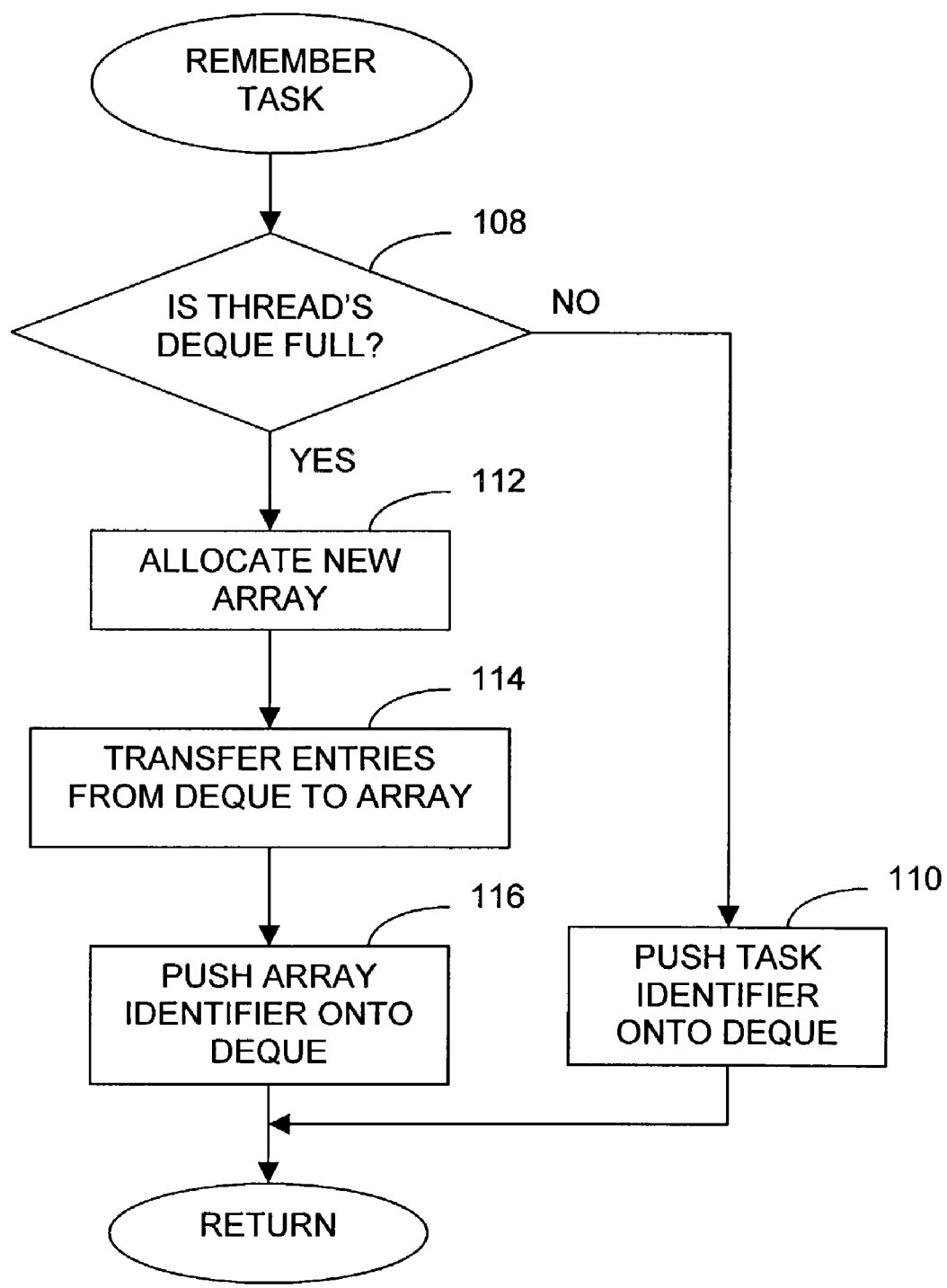
FIG. 15 is a flow chart of a routine employed for memorializing a task in a deque managed by allocating additional array space.

The approach just described encapsulates the current deque's entries in a list identifier placed in a new deque. An alternative approach is to encapsulate some number of a new array's entries in a list identifier placed in the existing deque. FIG. 15 is a flow chart that illustrates this approach. A thread that needs to memorialize a task determines whether its task deque is full, as block 108 indicates. If that deque is not full, the thread simply pushes that task identifier onto its deque in the normal manner, as block 110 indicates. Otherwise, as block 112 indicates, it allocates an array into which it places an identifier of the newly identified task, and, as block 114 indicates, it transfers some number of its deque entries into that array. The transfer operation will ordinarily be performed by popping entries from the bottom of the deque, although some embodiments may pop entries from the top for this purpose. The thread will then place an identifier of the array onto the deque, as block 116 indicates, typically by pushing it onto the top of the deque.

FIG. 16 is a listing of a top-pushing routine that can be used for this purpose. That routine reads the bottom- and top-index indicators in operations that the second and third lines represent. As the seventh and eighth lines indicate, it abstains from pushing an entry onto the deque if those values indicate that the deque is already full. Otherwise, the operations that the tenth and eleventh lines set forth calculate the value with which the routine will update the top-index indicator if the owner contends successfully for deque access. In its local value of the top-index indicator, that is, it (circularly) increments the index part and, for reasons mentioned above, also increments the tag part. As the fourteenth line indicates, the thread executing the routine then contends for write access to the deque's top-index indicator, updating it with the calculated value if no other thread has changed it since it was read in the third-line step. As the fifteenth and sixteenth lines indicate, the routine then returns an indication of whether the push operation was successful.

As the description of the FIG. 15 approach proceeds, it will become apparent that the possible number of tag values needed in the exemplary application can actually exceed the number of objects evacuated in a collection increment. But the required number can still be kept within desired bounds in that application by limiting the number of tasks appropriately, and, as a practical matter, doing so will rarely impose a serious restriction.

Figure 17:
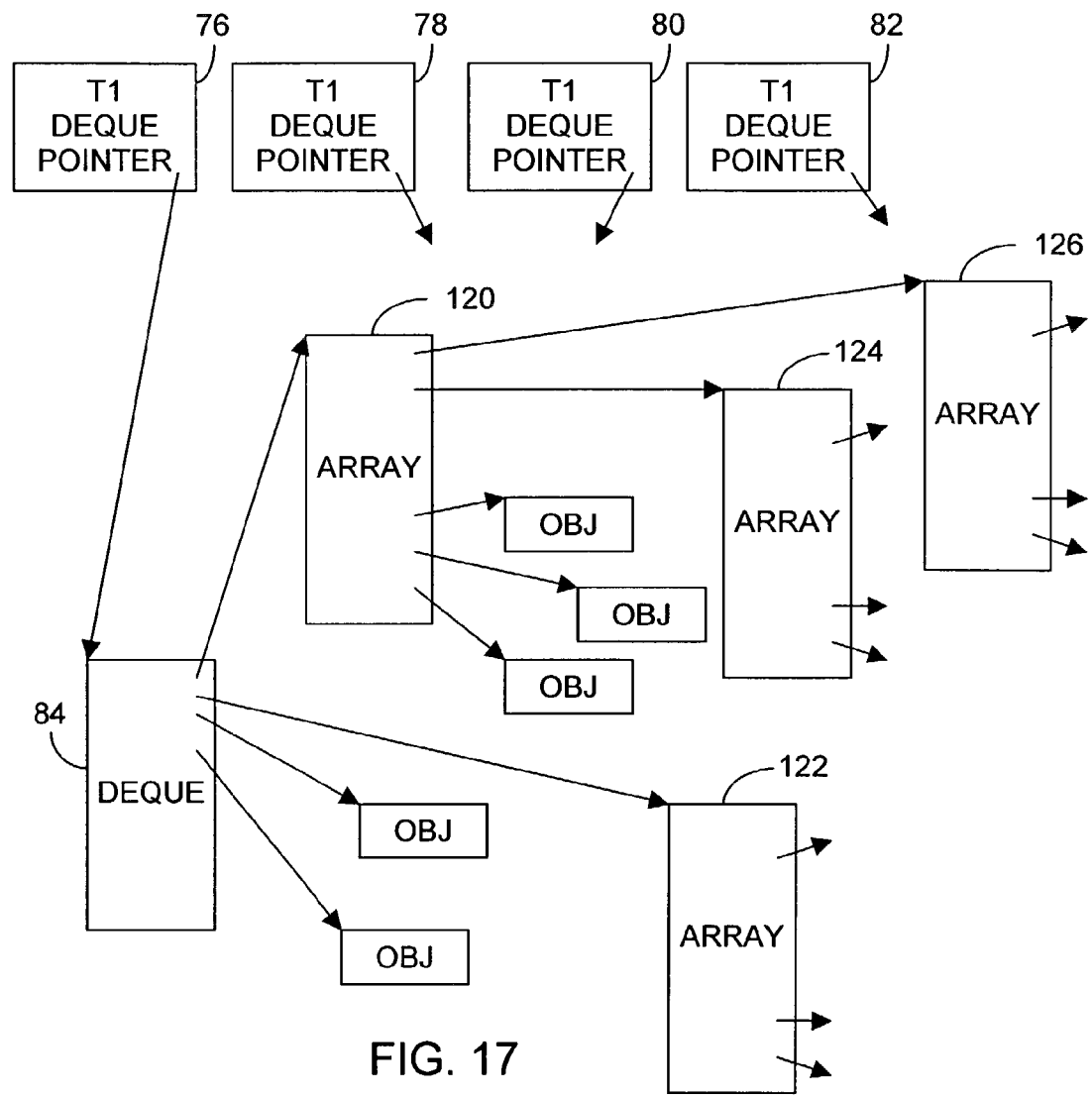
FIG. 17 is a block diagram illustrating the data-structure relationships that result from managing a deque in that fashion.

Using the approach of FIG. 15 can result in a topology such as the one that FIG. 17 illustrates. This topology has similarities to that of FIG. 13, but the array 84 identified by thread T1's deque pointer 76 is the original deque, and it points to a newly allocated array 120. Also, whereas each deque in the organization employed by the previous approach could identify as most one further deque, a deque in this approach can point to more than one array, as arrays 120 and 122 indicate. And each array can itself point to one or more further arrays, as arrays 124 and 126 indicate.

Figure 18:
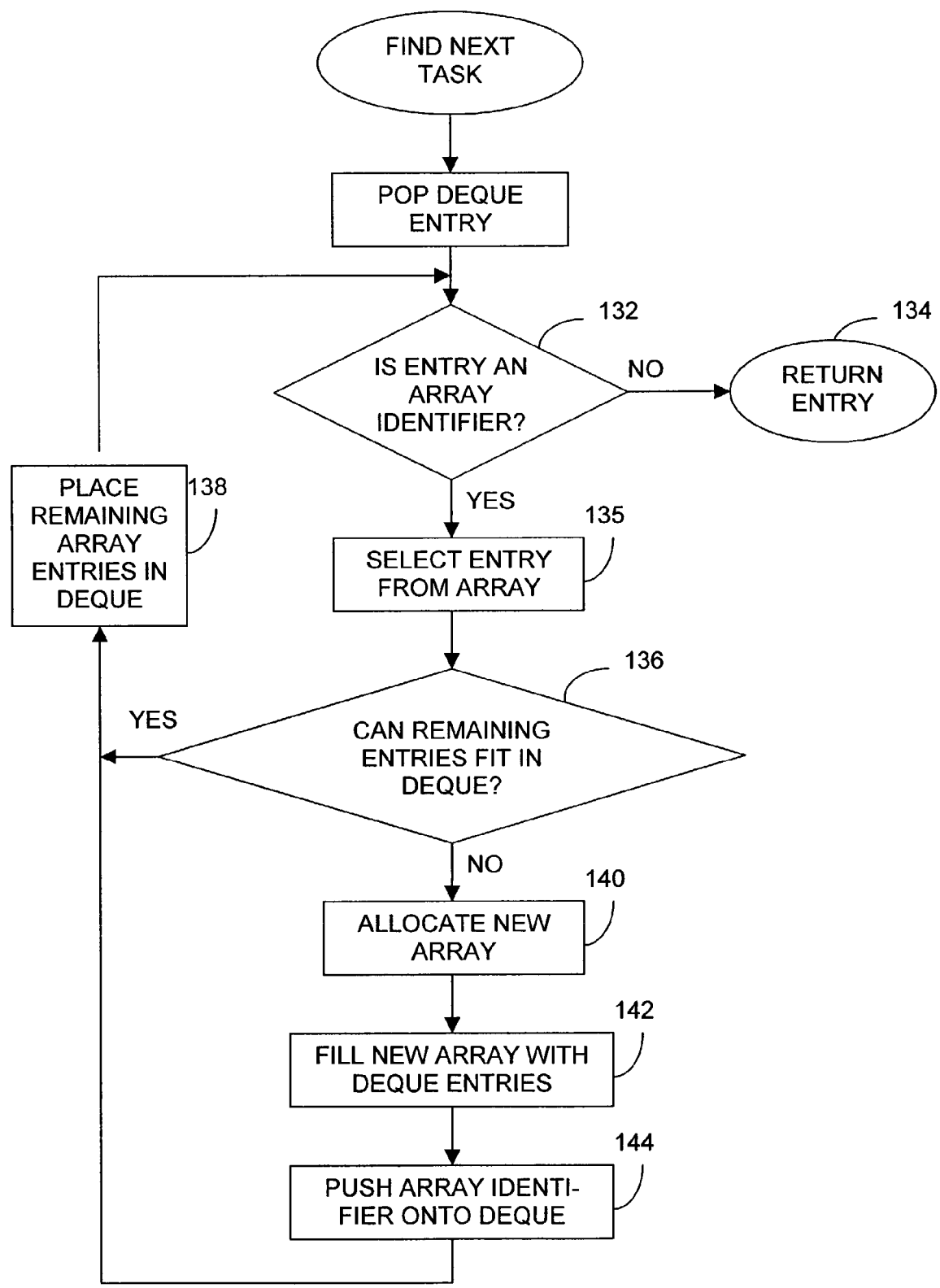
FIG. 18 is a flow chart of a routine for retrieving entries from a deque managed by transferring its entries into arrays when the deque overflows.

To retrieve a task identifier from a deque managed in this fashion, a thread may employ the routine that FIG. 18 depicts. In that routine, the thread begins by popping a top or bottom deque entry. As blocks 132 and 134 indicate, it simply returns the popped entry if that entry is a regular task identifier. If the entry is a list identifier, on the other hand, the thread selects an entry from that array, as block 135 indicates, and, as blocks 136 and 138 indicate, it places any remaining array entries into the deque if they fit.

Occasionally, though, those remaining entries will not fit into the deque. This will not happen in the case of stealing threads, at least if the array sizes are, as will be typical, smaller than or equal to deque sizes, because a stealer's deque will be empty. There will usually be enough room in the deque in the case of an owner thread, too, because list identifiers are pushed onto the top of the queue, whereas the owner pops from the bottom, so the owner will not ordinarily encounter such an identifier when the deque is nearly full. But an owner thread may nonetheless encounter one occasionally.

One way to deal with that situation is simply to place the list identifier back into the deque, possibly after popping a deque entry and placing it into the array slot from which the thread selected the array entry. More typically, the thread will allocate space for a new array, as block 140 indicates, and, as block 142 indicates, fill it with entries from the deque, thereby making room in the deque for the old array's remaining entries.

Independently of what is done with the remaining array entries, the selected array entry must be tested to determine whether it is a task identifier or a list identifier, so the routine loops to the test of block 132 to make that determination. This looping continues until a task identifier is found, and the routine returns that task identifier.

By removing a plurality of deque entries to an expansion space represented by a single deque entry, the present invention provides a way of dealing with deque overflow without requiring additional synchronization or restricting the range of the deque's applicability. The invention thus constitutes a significant advance in the art.

What is claimed is:

1. For employing a computer system, which includes memory, to execute a plurality of execution threads that perform tasks dynamically discovered thereby, a method comprising:

A) allocating in the computer system's memory a plurality of arrays, of which a respective one at a time is associated with each said thread;

B) employing each said thread to store as array entries in the array associated therewith task identifiers that identify tasks dynamically discovered by that thread;

C) employing at least one thread to store as an array entry in one of the arrays a list identifier that identifies an array that contains task identifiers; and D) employing at least one of the threads to perform on one of the arrays a task-retrieval operation in which that thread:
  i) retrieves an array entry from that array;
  ii) determines whether the array entry thus retrieved is a task identifier or a list identifier;
  iii) if the retrieved entry is a task identifier, performs the task thereby identified; and
  iv) if the retrieved array entry is a list identifier, performs a task-retrieval operation on the array thereby identified.

2. A method as defined in claim 1 wherein:
A) the threads are threads of a garbage collector; and
B) the dynamically discovered tasks include evacuating from a from space objects referred to by references located in objects outside the from space.

3. A method as defined in claim 1 wherein:
A) the threads are threads of a garbage collector; and
B) the tasks include inspecting respective objects for references to objects in a region being collected.

4. A method as defined in claim 3 wherein the task identifiers identify the objects to be inspected for references to objects in the region being collected.

5. A method as defined in claim 3 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

6. A method as defined in claim 1 wherein:
A) the collector treats the array entries in the arrays associated with respective threads as queue entries of respective queues, also associated with those threads, whereby a list identifier that identifies an array that contains a queue thereby also serves as a queue identifier that identifies that queue; and
B) when one of the threads discovers a task, it:
  i) adds to the queue associated therewith a task identifier representing that task if that queue is not full, and
  ii) if that queue is full;
    a) places in a new array a list identifier that identifies the array associated with that thread; and
    b) substitutes the new array as the array associated with that thread.

7. A method as defined in claim 6 wherein, when one of the threads discovers a task and the queue associated therewith is full, that thread additionally transfers task identifiers from the queue associated therewith to the new array.

8. A method as defined in claim 6 wherein:
A) the threads access the queues as deques having top and bottom ends, the queue entries thereby being deque entries;
B) when a thread retrieves a deque entry from the deque associated therewith, it pops that deque entry exclusively from one, bottom end of that deque; and
C) when a thread places into the new array the list identifier that identifies the deque associated with that thread, it so places that entry therein that, when that new array becomes the array associated with that thread and thereby contains the deque associated therewith, that entry is located at the other, top end of the deque associated with that thread.

9. A method as defined in claim 8 wherein, when a thread retrieves a deque entry from the deque associated with another of the threads, it pops that deque entry exclusively from the top end of that deque.

10. A method as defined in claim 8 wherein, when a thread adds a deque entry onto the deque associated therewith, it pushes that deque entry exclusively onto the bottom end of that deque.

11. A method as defined in claim 10 wherein, when a thread retrieves a deque entry from the deque associated with another of the threads, it pops that deque entry exclusively from the top end of that deque.

12. A method as defined in claim 6 wherein the array entries include respective type indicators that distinguish task identifiers from list identifiers.

13. A method as defined in claim 6 wherein the tasks are the processing of respective objects and the task identifiers include identifiers of the objects to be processed.

14. A method as defined in claim 6 wherein:
A) the threads are threads of a garbage collector; and
B) the dynamically discovered tasks include evacuating from a from space objects referred to by references located in objects outside the from space.

15. A method as defined in claim 6 wherein:
A) the threads are threads of a garbage collector; and
B) the tasks include inspecting respective objects for references to objects in a region being collected.

16. A method as defined in claim 15 wherein the task identifiers identify the objects to be inspected for references to objects in the region being collected.

17. A method as defined in claim 15 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

18. A method as defined in claim 1 wherein:
A) the collector treats the array entries in the arrays associated with respective threads as queue entries of respective queues, also associated with those threads, whereby a list identifier that identifies an array that contains a queue thereby also serves as a queue identifier that identifies that queue; and
B) when one of the threads discovers a task, it adds a new queue entry to the queue associated therewith, the new array entry comprising:
  i) if that queue is not full, a task identifier identifying that task; and
  ii) if that queue is full, a list identifier that identifies a new array, into which that thread transfers deque entries from that deque, whereby the list identifier additionally identifies the tasks identified by the array's entries.

19. A method as defined in claim 18 wherein:
A) the threads access the queues as deques having top and bottom ends, the queue entries thereby being deque entries;
B) when a thread retrieves a deque entry from the deque associated therewith, it pops that deque entry exclusively from one, bottom end of that deque; and
C) when a thread places into the deque associated therewith the list identifier that identifies the new array, it places that list identifier at the top of that deque.

20. A method as defined in claim 19 wherein, when a thread retrieves a deque entry from the deque associated with another of the threads, it pops that deque entry exclusively from the top end of that deque.

21. A method as defined in claim 19 wherein, when a thread adds a deque entry onto the deque associated therewith, it pushes that deque entry exclusively onto the bottom end of that deque.

22. A method as defined in claim 21 wherein, when a thread retrieves a deque entry from the deque associated with another of the threads, it pops that deque entry exclusively from the top end of that deque.

23. A method as defined in claim 18 wherein the array entries include respective type indicators that distinguish task identifiers from list identifiers.

24. A method as defined in claim 18 wherein the tasks are the processing of respective objects and the task identifiers include identifiers of the objects to be processed.

25. A method as defined in claim 18 wherein:
A) the threads are threads of a garbage collector; and
B) the dynamically discovered tasks include evacuating from a from space objects referred to by references located in objects outside the from space.

26. A method as defined in claim 18 wherein:
A) the threads are threads of a garbage collector; and
B) the tasks include inspecting respective objects for references to objects in a region being collected.

27. A method as defined in claim 26 wherein the task identifiers identify the objects to be inspected for references to objects in the region being collected.

28. A method as defined in claim 26 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

29. A computer system comprising:
A) processor circuitry operable to execute processor instructions; and
B) memory circuitry, to which the processor circuitry is responsive, that contains processor instructions readable by the processor circuitry to cause the processor to:
i) execute a plurality of execution threads that perform tasks dynamically discovered thereby;
ii) allocate in the computer system's memory a plurality of arrays, of which a respective one at a time is associated with each said thread;
iii) employ each said thread to store as array entries in the array associated therewith task identifiers that identify tasks dynamically discovered by that thread;
iv) employ at least one thread to store as an array entry in one of the arrays a list identifier that identifies an array that contains task identifiers; and
v) employ at least one of the threads to perform on one of the arrays a task-retrieval operation in which that thread:
a) retrieves an array entry from that array;
b) determines whether the array entry thus retrieved is a task identifier or a list identifier;
c) if the retrieved entry is a task identifier, performs the task thereby identified; and
d) if the retrieved array entry is a list identifier, performs a task-retrieval operation on the array thereby identified.

30. A computer system as defined in claim 29 wherein:
A) the threads are threads of a garbage collector; and
B) the dynamically discovered tasks include evacuating from a from space objects referred to by references located in objects outside the from space.

31. A computer system as defined in claim 29 wherein:
A) the threads are threads of a garbage collector; and
B) the tasks include inspecting respective objects for references to objects in a region being collected.

32. A computer system as defined in claim 31 wherein the task identifiers identify the objects to be inspected for references to objects in the region being collected.

33. A computer system as defined in claim 31 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

34. A computer system as defined in claim 29 wherein:
A) the collector treats the array entries in the arrays associated with respective threads as queue entries of respective queues, also associated with those threads, whereby a list identifier that identifies an array that contains a queue thereby also serves as a queue identifier that identifies that queue; and
B) when one of the threads discovers a task, it:
i) adds to the queue associated therewith a task identifier representing that task if that queue is not full, and
ii) if that queue is full;
a) places in a new array a list identifier that identifies the array associated with that thread; and
b) substitutes the new array as the array associated with that thread.

35. A computer system as defined in claim 34 wherein, when one of the threads discovers a task and the queue associated therewith is full, that thread additionally transfers task identifiers from the queue associated therewith to the new array.

36. A computer system as defined in claim 34 wherein:
A) the threads access the queues as deques having top and bottom ends, the queue entries thereby being deque entries;
B) when a thread retrieves a deque entry from the deque associated therewith, it pops that deque entry exclusively from one, bottom end of that deque; and
C) when a thread places into the new array the list identifier that identifies the deque associated with that thread, it so places that entry therein that, when that new array becomes the array associated with that thread and thereby contains the deque associated therewith, that entry is located at the other, top end of the deque associated with that thread.

37. A computer system as defined in claim 36 wherein, when a thread retrieves a deque entry from the deque associated with another of the threads, it pops that deque entry exclusively from the top end of that deque.

38. A computer system as defined in claim 36 wherein, when a thread adds a deque entry onto the deque associated therewith, it pushes that deque entry exclusively onto the bottom end of that deque.

39. A computer system as defined in claim 38 wherein, when a thread retrieves a deque entry from the deque associated with another of the threads, it pops that deque entry exclusively from the top end of that deque.

40. A computer system as defined in claim 34 wherein the array entries include respective type indicators that distinguish task identifiers from list identifiers.

41. A computer system as defined in claim 34 wherein the tasks are the processing of respective objects and the task identifiers include identifiers of the objects to be processed.

42. A computer system as defined in claim 34 wherein:
A) the threads are threads of a garbage collector; and
B) the dynamically discovered tasks include evacuating from a from space objects referred to by references located in objects outside the from space.

43. A computer system as defined in claim 34 wherein:
A) the threads are threads of a garbage collector; and
B) the tasks include inspecting respective objects for references to objects in a region being collected.

44. A computer system as defined in claim 43 wherein the task identifiers identify the objects to be inspected for references to objects in the region being collected.

45. A computer system as defined in claim 43 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

46. A computer system as defined in claim 29 wherein:
A) the collector treats the array entries in the arrays associated with respective threads as queue entries of respective queues, also associated with those threads, whereby a list identifier that identifies an array that contains a queue thereby also serves as a queue identifier that identifies that queue; and
B) when one of the threads discovers a task, it adds a new queue entry to the queue associated therewith, the new array entry comprising:
  i) if that queue is not full, a task identifier identifying that task; and
  ii) if that queue is full, a list identifier that identifies a new array, into which that thread transfers deque entries from that deque, whereby the list identifier additionally identifies the tasks identified by the array's entries.

47. A computer system as defined in claim 46 wherein:
A) the threads access the queues as deques having top and bottom ends, the queue entries thereby being deque entries;
B) when a thread retrieves a deque entry from the deque associated therewith, it pops that deque entry exclusively from one, bottom end of that deque; and
C) when a thread places into the deque associated therewith the list identifier that identifies the new array, it places that list identifier at the top of that deque.

48. A computer system as defined in claim 47 wherein, when a thread retrieves a deque entry from the deque associated with another of the threads, it pops that deque entry exclusively from the top end of that deque.

49. A computer system as defined in claim 47 wherein, when a thread adds a deque entry onto the deque associated therewith, it pushes that deque entry exclusively onto the bottom end of that deque.

50. A computer system as defined in claim 49 wherein, when a thread retrieves a deque entry from the deque associated with another of the threads, it pops that deque entry exclusively from the top end of that deque.

51. A computer system as defined in claim 46 wherein the array entries include respective type indicators that distinguish task identifiers from list identifiers.

52. A computer system as defined in claim 46 wherein the tasks are the processing of respective objects and the task identifiers include identifiers of the objects to be processed.

53. A computer system as defined in claim 46 wherein:
A) the threads are threads of a garbage collector; and
B) the dynamically discovered tasks include evacuating from a from space objects referred to by references located in objects outside the from space.

54. A computer system as defined in claim 46 wherein:
A) the threads are threads of a garbage collector; and
B) the tasks include inspecting respective objects for references to objects in a region being collected.

55. A computer system as defined in claim 54 wherein the task identifiers identify the objects to be inspected for references to objects in the region being collected.

56. A computer system as defined in claim 54 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

57. A storage medium containing instructions readable by a computer system that includes memory to configure the computer system to:
A) execute a plurality of execution threads that perform tasks dynamically discovered thereby;
B) allocate in the computer system's memory a plurality of arrays, of which a respective one at a time is associated with each said thread;
C) employ each said thread to store as array entries in the array associated therewith task identifiers that identify tasks dynamically discovered by that thread;
D) employ at least one thread to store as an array entry in one of the arrays a list identifier that identifies an array that contains task identifiers; and
E) employ at least one of the threads to perform on one of the arrays a task-retrieval operation in which that thread:
  i) retrieves an array entry from that array;
  ii) determines whether the array entry thus retrieved is a task identifier or a list identifier;
  iii) if the retrieved entry is a task identifier, performs the task thereby identified; and
  iv) if the retrieved array entry is a list identifier, performs a task-retrieval operation on the array thereby identified.

58. A storage medium as defined in claim 57 wherein:
A) the threads are threads of a garbage collector; and
B) the dynamically discovered tasks include evacuating from a from space objects referred to by references located in objects outside the from space.

59. A storage medium as defined in claim 57 wherein:
A) the threads are threads of a garbage collector; and
B) the tasks include inspecting respective objects for references to objects in a region being collected.

60. A storage medium as defined in claim 59 wherein the task identifiers identify the objects to be inspected for references to objects in the region being collected.

61. A storage medium as defined in claim 59 wherein:
A) the garbage collector is a copying collector, which treats the region being collected as a from space from which it evacuates potentially reachable objects; and B) the dynamically discovered tasks further include evacuating from the from space objects referred to by references located in the objects inspected for references to objects in the from space.

62. A storage medium as defined in claim 57 wherein:
A) the collector treats the array entries in the arrays associated with respective threads as queue entries of respective queues, also associated with those threads, whereby a list identifier that identifies an array that contains a queue thereby also serves as a queue identifier that identifies that queue; and
B) when one of the threads discovers a task, it:
  i) adds to the queue associated therewith a task identifier representing that task if that queue is not full, and
  ii) if that queue is full;
    a) places in a new array a list identifier that identifies the array associated with that thread; and
    b) substitutes the new array as the array associated with that thread.

63. A storage medium as defined in claim 62 wherein, when one of the threads discovers a task and the queue associated therewith is full, that thread additionally transfers task identifiers from the queue associated therewith to the new array.

64. A storage medium as defined in claim 62 wherein:
A) the threads access the queues as deques having top and bottom ends, the queue entries thereby being deque entries;
B) when a thread retrieves a deque entry from the deque associated therewith, it pops that deque entry exclusively from one, bottom end of that deque; and
C) when a thread places into the new array the list identifier that identifies the deque associated with that thread, it so places that entry therein that, when that new array becomes the array associated with that thread and thereby contains the deque associated therewith, that entry is located at the other, top end of the deque associated with that thread.

65. A storage medium as defined in claim 64 wherein, when a thread retrieves a deque entry from the deque associated with another of the threads, it pops that deque entry exclusively from the top end of that deque.

66. A storage medium as defined in claim 64 wherein, when a thread adds a deque entry onto the deque associated therewith, it pushes that deque entry exclusively onto the bottom end of that deque.

67. A storage medium as defined in claim 66 wherein, when a thread retrieves a deque entry from the deque associated with another of the threads, it pops that deque entry exclusively from the top end of that deque.

68. A storage medium as defined in claim 62 wherein the array entries include respective type indicators that distinguish task identifiers from list identifiers.

69. A storage medium as defined in claim 62 wherein the tasks are the processing of respective objects and the task identifiers include identifiers of the objects to be processed.

70. A storage medium as defined in claim 62 wherein:
A) the threads are threads of a garbage collector; and
B) the dynamically discovered tasks include evacuating from a from space objects referred to by references located in objects outside the from space.

71. A storage medium as defined in claim 62 wherein:
A) the threads are threads of a garbage collector; and
B) the tasks include inspecting respective objects for references to objects in a region being collected.

72. A storage medium as defined in claim 71 wherein the task identifiers identify the objects to be inspected for references to objects in the region being collected.

73. A storage medium as defined in claim 71 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

74. A storage medium as defined in claim 57 wherein:
A) the collector treats the array entries in the arrays associated with respective threads as queue entries of respective queues, also associated with those threads, whereby a list identifier that identifies an array that contains a queue thereby also serves as a queue identifier that identifies that queue; and
B) when one of the threads discovers a task, it adds a new queue entry to the queue associated therewith, the new array entry comprising:
  i) if that queue is not full, a task identifier identifying that task; and
  ii) if that queue is full, a list identifier that identifies a new array, into which that thread transfers deque entries from that deque, whereby the list identifier additionally identifies the tasks identified by the array's entries.

75. A storage medium as defined in claim 74 wherein:
A) the threads access the queues as deques having top and bottom ends, the queue entries thereby being deque entries;
B) when a thread retrieves a deque entry from the deque associated therewith, it pops that deque entry exclusively from one, bottom end of that deque; and
C) when a thread places into the deque associated therewith the list identifier that identifies the new array, it places that list identifier at the top of that deque.

76. A storage medium as defined in claim 75 wherein, when a thread retrieves a deque entry from the deque associated with another of the threads, it pops that deque entry exclusively from the top end of that deque.

77. A storage medium as defined in claim 75 wherein, when a thread adds a deque entry onto the deque associated therewith, it pushes that deque entry exclusively onto the bottom end of that deque.

78. A storage medium as defined in claim 77 wherein, when a thread retrieves a deque entry from the deque associated with another of the threads, it pops that deque entry exclusively from the top end of that deque.

79. A storage medium as defined in claim 74 wherein the array entries include respective type indicators that distinguish task identifiers from list identifiers.

80. A storage medium as defined in claim 74 wherein the tasks are the processing of respective objects and the task identifiers include identifiers of the objects to be processed.

81. A storage medium as defined in claim 74 wherein:
A) the threads are threads of a garbage collector; and
B) the dynamically discovered tasks include evacuating from a from space objects referred to by references located in objects outside the from space.

82. A storage medium as defined in claim 74 wherein:
A) the threads are threads of a garbage collector; and
B) the tasks include inspecting respective objects for references to objects in a region being collected.

83. A storage medium as defined in claim 82 wherein the task identifiers identify the objects to be inspected for references to objects in the region being collected.

84. A storage medium as defined in claim 82 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

85. A computer program product comprising a tangible computer usable medium having computer readable program code thereon representing sequences of instructions that, when executed by a computer system that includes memory, cause the computer system to:
A) execute a plurality of execution threads that perform tasks dynamically discovered thereby;
B) allocate in the computer system's memory a plurality of arrays, of which a respective one at a time is associated with each said thread;
C) employ each said thread to store as array entries in the array associated therewith task identifiers that identify tasks dynamically discovered by that thread;
D) employ at least one thread to store as an array entry in one of the arrays a list identifier that identifies an array that contains task identifiers; and
E) employ at least one of the threads to perform on one of the arrays a task-retrieval operation in which that thread:
i) retrieves an array entry from that array;
ii) determines whether the array entry thus retrieved is a task identifier or a list identifier;
iii) if the retrieved entry is a task identifier, performs the task thereby identified; and iv) if the retrieved array entry is a list identifier, performs a task-retrieval operation on the array thereby identified.

86. A computer program product as defined in claim 85 wherein:
A) the threads are threads of a garbage collector; and
B) the dynamically discovered tasks include evacuating from a from space objects referred to by references located in objects outside the from space.

87. A computer program product as defined in claim 85 wherein:
A) the threads are threads of a garbage collector; and
B) the tasks include inspecting respective objects for references to objects in a region being collected.

88. A computer program product as defined in claim 87 wherein the task identifiers identify the objects to be inspected for references to objects in the region being collected.

89. A computer program product as defined in claim 87 wherein:
A) the garbage collector is a copying collector, which treats the region being collected as a from space from which it evacuates potentially reachable objects; and
B) the dynamically discovered tasks further include evacuating from the from space objects referred to by references located in the objects inspected for references to objects in the from space.

90. A computer program product as defined in claim 85 wherein:
A) the collector treats the array entries in the arrays associated with respective threads as queue entries of respective queues, also associated with those threads, whereby a list identifier that identifies an array that contains a queue thereby also serves as a queue identifier that identifies that queue; and
B) when one of the threads discovers a task, it:
i) adds to the queue associated therewith a task identifier representing that task if that queue is not full, and
ii) if that queue is full;
a) places in a new array a list identifier that identifies the array associated with that thread; and
b) substitutes the new array as the array associated with that thread.

91. A computer program product as defined in claim 90 wherein, when one of the threads discovers a task and the queue associated therewith is full, that thread additionally transfers task identifiers from the queue associated therewith to the new array.

92. A computer program product as defined in claim 90 wherein:
A) the threads access the queues as deques having top and bottom ends, the queue entries thereby being deque entries;
B) when a thread retrieves a deque entry from the deque associated therewith, it pops that deque entry exclusively from one, bottom end of that deque; and
C) when a thread places into the new array the list identifier that identifies the deque associated with that thread, it so places that entry therein that, when that new array becomes the array associated with that thread and thereby contains the deque associated therewith, that entry is located at the other, top end of the deque associated with that thread.

93. A computer program product as defined in claim 92 wherein, when a thread retrieves a deque entry from the deque associated with another of the threads, it pops that deque entry exclusively from the top end of that deque.

94. A computer program product as defined in claim 92 wherein, when a thread adds a deque entry onto the deque associated therewith, it pushes that deque entry exclusively onto the bottom end of that deque.

95. A computer program product as defined in claim 94 wherein, when a thread retrieves a deque entry from the deque associated with another of the threads, it pops that deque entry exclusively from the top end of that deque.

96. A computer program product as defined in claim 90 wherein the array entries include respective type indicators that distinguish task identifiers from list identifiers.

97. A computer program product as defined in claim 90 wherein the tasks are the processing of respective objects and the task identifiers include identifiers of the objects to be processed.

98. A computer program product as defined in claim 90 wherein:
A) the threads are threads of a garbage collector; and
B) the dynamically discovered tasks include evacuating from a from space objects referred to by references located in objects outside the from space.

99. A computer program product as defined in claim 90 wherein:
A) the threads are threads of a garbage collector; and
B) the tasks include inspecting respective objects for references to objects in region being collected.

100. A computer program product as defined in claim 99 wherein the task identifiers identify the objects to be inspected for references to objects in the region being collected.

101. A computer program product as defined in claim 99 wherein:
- A) the garbage collector is a copying collector, which treats the region being collected as a from space from which it evacuates potentially reachable objects; and
- B) the dynamically discovered tasks further include evacuating from the from space objects referred to by references located in the objects inspected for references to objects in the from space.

102. A computer program product as defined in claim 85 wherein:
- A) the collector treats the array entries in the arrays associated with respective threads as queue entries of respective queues, also associated with those threads, whereby a list identifier that identifies an array that contains a queue thereby also serves as a queue identifier that identifies that queue; and
- B) when one of the threads discovers a task, it adds a new queue entry to the queue associated therewith, the new array entry comprising:
  - i) if that queue is not full, a task identifier identifying that task; and
  - ii) if that queue is full, a list identifier that identifies a new array, into which that thread transfers deque entries from that deque, whereby the list identifier additionally identifies the tasks identified by the array's entries.

103. A computer program product as defined in claim 102 wherein:
- A) the threads access the queues as deques having top and bottom ends, the queue entries thereby being deque entries;
- B) when a thread retrieves a deque entry from the deque associated therewith, it pops that deque entry exclusively from one, bottom end of that deque; and
- C) when a thread places into the deque associated therewith the list identifier that identifies the new array, it places that list identifier at the top of that deque.

104. A computer program product as defined in claim 103 wherein, when a thread retrieves a deque entry from the deque associated with another of the threads, it pops that deque entry exclusively from the top end of that deque.

105. A computer program product as defined in claim 103 wherein, when a thread adds a deque entry onto the deque associated therewith, it pushes that deque entry exclusively onto the bottom end of that deque.

106. A computer program product as defined in claim 105 wherein, when a thread retrieves a deque entry from the deque associated with another of the threads, it pops that deque entry exclusively from the top end of that deque.

107. A computer program product as defined in claim 102 wherein the array entries include respective type indicators that distinguish task identifiers from list identifiers.

108. A computer program product as defined in claim 102 wherein the tasks are the processing of respective objects and the task identifiers include identifiers of the objects to be processed.

109. A computer program product as defined in claim 102 wherein:
- A) the threads are threads of a garbage collector; and
- B) the dynamically discovered tasks include evacuating from a from space objects referred to by references located in objects outside the from space.

110. A computer program product as defined in claim 102 wherein:
- A) the threads are threads of a garbage collector; and
- B) the tasks include inspecting respective objects for references to objects in a region being collected.

111. A computer program product as defined in claim 110 wherein the task identifiers identify the objects to be inspected for references to objects in the region being collected.

112. A computer program product as defined in claim 110 wherein:
- A) the garbage collector is a copying collector, which treats the region being collected as a from space from which it evacuates potentially reachable objects; and
- B) the dynamically discovered tasks further include evacuating from the from space objects referred to by references located in the objects inspected for references to objects in the from space.

113. A computer system comprising:
- A) means for executing a plurality of execution threads that perform tasks dynamically discovered thereby;
- B) means for allocating in the computer system's memory a plurality of arrays, of which a respective one at a time is associated with each said thread;
- C) means for employing each said thread to store as array entries in the array associated therewith task identifiers that identify tasks dynamically discovered by that thread;
- D) means for employing at least one thread to store as an array entry in one of the arrays a list identifier that identifies an array that contains task identifiers; and
- E) means for employing at least one of the threads to perform on one of the arrays a task-retrieval operation in which that thread:
  - i) retrieves an array entry from that array;
  - ii) determines whether the array entry thus retrieved is a task identifier or a list identifier;
  - iii) if the retrieved entry is a task identifier, performs the task thereby identified; and
  - iv) if the retrieved array entry is a list identifier, performs a task-retrieval operation on the array thereby identified.

* * * * *